United States Patent
Chircorian

(10) Patent No.: US 11,720,695 B2
(45) Date of Patent: Aug. 8, 2023

(54) SERVER-BASED ELECTRONIC PUBLICATION MANAGEMENT

(75) Inventor: Armen Chircorian, Glendale, CA (US)

(73) Assignee: WEBSISTANT, L.L.C., Glendale, CA (US)

( * ) Notice: Subject to any disclaimer, the term of this patent is extended or adjusted under 35 U.S.C. 154(b) by 0 days.

(21) Appl. No.: 14/241,169

(22) PCT Filed: Sep. 1, 2012

(86) PCT No.: PCT/US2012/053561
§ 371 (c)(1),
(2), (4) Date: Feb. 26, 2014

(87) PCT Pub. No.: WO2013/033664
PCT Pub. Date: Mar. 7, 2013

(65) Prior Publication Data
US 2014/0214503 A1 Jul. 31, 2014

Related U.S. Application Data

(60) Provisional application No. 61/530,378, filed on Sep. 1, 2011.

(51) Int. Cl.
*G06F 40/10* (2020.01)
*G06F 21/62* (2013.01)
(Continued)

(52) U.S. Cl.
CPC .............. *G06F 21/62* (2013.01); *G06F 40/10* (2020.01); *G06Q 10/10* (2013.01); *G06Q 30/0241* (2013.01); *H04L 67/02* (2013.01)

(58) Field of Classification Search
CPC ..... H04L 64/02; H04L 67/02; G06Q 30/0241; G06Q 10/10; G06Q 30/024; G06F 16/30;
(Continued)

(56) References Cited

U.S. PATENT DOCUMENTS 6,898,601 B2   5/2005   Amado et al.
7,913,311 B2   3/2011   Alain et al.
(Continued)

FOREIGN PATENT DOCUMENTS

WO   2009/037663 A2   3/2009

OTHER PUBLICATIONS

Search Report for PCT/US12/53561 dated Feb. 28, 2013, 17 pages.

*Primary Examiner* — Sanchita Roy
(74) *Attorney, Agent, or Firm* — Loza & Loza, LLP; Stephen D. Burbach

(57) ABSTRACT

An electronic publication (e.g., an electronic document, e-book, e-pub, etc.) is created and edited using content provided by at least one source. In some aspects, a server-based (e.g., web-based) environment enables multiple authors to seamlessly corroborate to create an electronic publication. In some aspects, a server-based environment enables content to be automatically or manually in a non-linear manner (e.g., designing pages while writing content, and vice versa, or one before the other) become incorporated into an electronic digitally interactive book and print-ready publication (e.g. books, novels, yearbooks, textbooks, comic books, etc.). In some aspects, a server-based environment provides new and innovative ways to incorporate subscriptions and advertisements into an electronic publication, and to display these advertisements in the electronic publication.

31 Claims, 20 Drawing Sheets

(51) Int. Cl.
*G06Q 10/10* (2023.01)
*G06Q 30/0241* (2023.01)
*H04L 67/02* (2022.01)

(58) Field of Classification Search
CPC . G06F 16/20; G06F 21/62; G06F 3/04; G06F 16/958; G06F 16/972; G06F 16/986
USPC ..................................... 715/209, 200–205
See application file for complete search history.

(56) References Cited

U.S. PATENT DOCUMENTS

| | | | |
|---|---|---|---|
| 8,555,159 B1* | 10/2013 | Shmulevich | G06F 40/134 715/255 |
| 2003/0163784 A1 | 8/2003 | Daniel et al. | |
| 2005/0142528 A1* | 6/2005 | Veselova | G09B 5/00 434/307 R |
| 2005/0262243 A1* | 11/2005 | Ternasky | G06F 21/10 709/225 |
| 2006/0120522 A1 | 6/2006 | Clark et al. | |
| 2006/0235984 A1* | 10/2006 | Kraus | G06F 16/958 709/228 |
| 2007/0050403 A1* | 3/2007 | Dhairyawan | G06F 40/10 |
| 2007/0186157 A1* | 8/2007 | Walker | G06F 17/24 715/234 |
| 2007/0244906 A1* | 10/2007 | Colton | G06F 17/2288 |
| 2008/0066185 A1* | 3/2008 | Lester | G06F 21/10 726/27 |
| 2008/0172446 A1 | 7/2008 | Donovan et al. | |
| 2009/0254802 A1* | 10/2009 | Campagna | G06F 40/114 709/204 |
| 2009/0327294 A1* | 12/2009 | Bailor | G06F 17/24 |
| 2010/0241963 A1* | 9/2010 | Kulis | G06F 3/167 715/727 |
| 2010/0287188 A1* | 11/2010 | Kakar | G06Q 10/06 715/764 |
| 2011/0145702 A1* | 6/2011 | Kakehi | G06F 21/6209 715/255 |
| 2011/0203006 A1* | 8/2011 | Gopalakrishnan | G06F 21/10 726/29 |
| 2011/0231290 A1* | 9/2011 | Narcisse | G06Q 30/0601 705/27.1 |
| 2012/0033241 A1* | 2/2012 | Park | G06F 40/151 358/1.13 |
| 2012/0096087 A1* | 4/2012 | Curcelli | G06Q 10/101 709/204 |
| 2012/0185759 A1* | 7/2012 | Balinsky | G06F 21/6227 715/209 |
| 2012/0215686 A1* | 8/2012 | Lauzon | G06Q 10/10 705/39 |
| 2012/0272159 A1* | 10/2012 | Seth | G06Q 10/10 715/751 |
| 2013/0291126 A1* | 10/2013 | Thomson | G06F 17/30014 726/30 |

\* cited by examiner

☐ CREATE A BRAGBOOK   ☐ DASHBOARD  ☐ LIBRARY  ☐ PHOTOS  ☐ SEARCH

USER NAME
*MALE  SINGLE  BORN ON 1/1/1990  Lives in:  From:*

EDIT PROFILE | CHANGE PROFILE

| INTERNET | CONTACT | EDUCATION | FILES | BRAGBOOK | MESSAGES | RELATIONS |

| ADVERTISERS | AUTHORS | BUDDIES | COLLEAGUES | FANS | SIBLINGS | PENDING REQUESTS |

| ADVERTISERS | PENDING REQUESTS | SENT REQUESTS |

ACME
ACME CORP.
CITY, STATE
X REMOVE

SERVER-BASED ELECTRONIC PUBLICATION MANAGEMENT

CLAIM OF PRIORITY

This application claims the benefit of and priority to commonly owned U.S. Provisional Patent Application No. 61/530,378, filed Sep. 1, 2011, and assigned Attorney Docket No. W1-1230, the disclosure of which is hereby incorporated by reference herein.

BACKGROUND

Field

This application relates generally to electronic publication management and more specifically, but not exclusively, to creating and using electronic publications managed on a server.

Introduction

Traditional electronic publication systems are based on application specific programs (e.g., word processing programs, spreadsheets, etc.) installed on computers that allow users to create, edit, and print electronic publications. Thus, to use a given electronic publication, a user must have access to an electronic copy of the publication (e.g., stored on a hard drive or a removable storage medium) and have access to a computer that has the appropriate program for that electronic publication. In general, the created electronic publications are only made visible to other users without actually providing any user any copy of any work—the function of copying is only delegated to each user for the user's own content brought into the network or sub networks of the application.

Advances have been made in corroboration tools for electronic publications and documents. For example, some tools allow multiple users to share an electronic publication. To this end, the tool enables a given user to check out given electronic access to an electronic publication and edit that electronic publication. After that user checks in the electronic publication, an owner or permitted user may then check out the electronic publication and edit the electronic publication. It should be noted that the owner of the publication has full control of the publication and is given rights as well as access to revert content and track changes from other permitted users. Permitting a user to edit an electronic publication is not the way a viewing user would view the electronic publication, an action which can be found later in another branch within the application's framework.

To further improve user convenience when working with electronic publications, web-based electronic publications or document publication systems have been developed that enable a user to access an electronic publication using a web browser by dynamically editing content. In any case, the electronic publication may be stored on a private, local, government, or remote web server. Thus, a user may access the electronic publication from any computer that has connectivity to the web server and that has a web browser with a live connection.

SUMMARY

A summary of several sample aspects of the disclosure follows. This summary is provided for the convenience of the reader and does not wholly define the breadth of the disclosure. For convenience, the term some aspects may be used herein to refer to a single aspect or multiple aspects of the disclosure.

An innovative form of electronic publication management is disclosed. In accordance with the teachings herein, an electronic publication (e.g., an electronic document in the form of a book, novel, scrapbook, journal, diary, or comic book) is created and edited using content provided by one or more sources within the framework of the application as well as imported from third party repositories, sources, and applications.

The disclosure relates in some aspects to a server-based (e.g., web-based) environment that enables users (e.g., authors or other content providers, customers, etc., using web browsers) to access a web page served by a serving entity such as a client server (e.g., implemented using one or more of: a cloud-based server, a dedicated (e.g., in-house) server, a database server, or some other type of serving entity). This web application provides an environment that enables the users to create, share, and publish many types of information that are available in an electronic form. For example, the application may allow multiple users to corroborate, create, and share entire compiled books or publications at once with abilities for real-time management and non-linear processes.

In some aspects, non-linear processes (e.g., non-linear editing) include designing pages while writing content, and vice versa, or one before the other. In some aspects, non-linear editing involves creating the output design and format before creating content, or vice versa. In some aspects, non-linear editing involves cutting-and-pasting or dragging-and-dropping content into a previously created publication. In some aspects, non-linear editing involves non-destructive editing on the source material or the user-created content (e.g., deleting content doesn't destroy functionality of the live or final publication).

The disclosure relates in some aspects to a server-based (e.g., web-based) environment that enables multiple authors to seamlessly corroborate to create an electronic publication. Advantageously, various techniques are provided for controlling user access to the electronic publication. For example, a main author of an electronic publication may authorize one or more authors to access (e.g., edit) the electronic publication. In some cases, a given author may be granted only limited privileges. For example, one author may be authorized to access one section (or a few sections) of the electronic publication, another author may be authorized to access another section (or a few other sections) of the electronic publication, and so on. Advantageously, different authors may be allowed to concurrently access the electronic publication. For example, one author may access a first section of the electronic publication, while another author concurrently accesses a second section of the electronic publication. Moreover, to keep track of any changes to the electronic publication, logging (e.g., including time-stamping) may be employed to track various details relating to a given user's accesses of an electronic publication (e.g., tracking accesses of a given section).

For convenience, the digital information that is provided through the use of the disclosed server-based environment is referred to herein as an electronic publication. An electronic publication may take a variety of forms and include a variety of information.

A wide variety of content types may be incorporated into an electronic publication. For example, an electronic publication may include one or more of text, graphics, photographs, audio, speech, music, video, or any other type of content that can be stored in digital form.

In some aspects, an electronic publication is provided in a structured multi-format, multi-layer, digital or print-ready compiled format. In some aspects, an electronic publication may take the digital form of one or more of: an electronic document, an electronic book (e-book), a brag book, a magazine, a newspaper, a flyer, marketing material, an advertisement (e.g., full page/half page/multiple page), an article, a yearbook, a look-book, an itinerary, a journal, a document, a comic book, a textbook, a novella, a scrapbook, a graphic novel, a scratch book, a pen pad, a legal document, a restaurant menu, or some other type of object (e.g., DIGI GLU discussed below). In some cases, reference is made herein to an e-book or e-pub. It should be appreciated that any discussions pertaining to an e-book herein may equally be applicable to the broader concept of an electronic publication and the multitudes of forms it carries.

In accordance with the teachings herein, an electronic publication may be comprised of a plurality of sections. A section may take different forms in different applications. For example, sections may comprise one or more of: documents, sub-sections, multi-tier sections, elements, clauses, divisions, sub-divisions, components, chapters, partitions, portions, parts, diaries, parts, segments, bits, pieces, components, areas, passages, phrases, points, or some other suitable structure that serves to subdivide an electronic publication.

The disclosure relates in some aspects to a server-based environment that enables content to be automatically incorporated into an electronic publication. For example, an import method may be employed to automatically import designated content and information (e.g., social media information, advertisement information, and so on) from a designated source (e.g., a social media server, or some other type of serving entity), and incorporate that information into a designated section of an electronic publication. The environment enables a user to conveniently record thoughts (e.g., stored on a server, in a database, or some other suitable digital content storage), edit the recorded thoughts, and incorporate those thoughts into an electronic publication. In some aspects, the recordation of such thoughts may be referred to herein as a ThoughtSpace or a ThoughtList. ThoughtSpace may comprise, for example, an open area (e.g., unorganized space) for storing thoughts. ThoughtList may comprise, for example, an organized list of thoughts. The environment thus provides an efficient mechanism that enables users, authors, and other content providers to specify the information to be utilized, the source of the information, and the destination of the information. As another example, templates, illustrations, and other structures provided by content providers are made available through the environment to users (e.g., authors, illustrators, and publishers). Thus, in addition to content authors create themselves or that illustrators create for others, electronic-specific content provided by others (e.g., fee-based content) is readily available to the authors via the environment. In some implementations, to keep track of any changes to relating to importing, logging (e.g., including time-stamping) may be employed to track various details relating to any imported information that was incorporated into an electronic publication (e.g., tracking incorporation of information in a given section).

The disclosure relates in some aspects to a server-based environment that provides new and innovative ways to incorporate advertisements and subscriptions into an electronic publication and to display these advertisements and subscriptions in the electronic publication based on custom and pre-defined template designs. For example, the environment provides a mechanism for advertisers to present content or advertisement to authors, end-users (e.g., readers of the electronic publication), or any other person that accesses an electronic publication at any stage of electronic publication creation, editing, or publishing. The manner in which advertisements are presented may be custom tailored based on various criteria. For example, the location of advertisement presentation (e.g., which section, which area of a page), the manner of advertisement presentation (e.g., stationary, rolling over, pop-out, subscription forms, or floating advertisement), the timing (e.g., periodicity, page interval) of advertisement presentation, or any other aspects of advertisement presentation may be based on: whether a user is a paid subscriber, a fee structure employed by an advertiser, pre-paid fee usage charge, a fee structure for the authors (including the main author), or some other advertising and subscription related criteria. In some implementations, to keep track of any changes relating to advertisements, logging (e.g., including time-stamping) may be employed to track various details relating to any advertisement information that was incorporated into an electronic publication (e.g., tracking incorporation of advertisement information in a given section).

The disclosure relates in some aspects to a server-based environment that facilitates publishing an electronic publication created in accordance with the teachings herein. Here, a final electronic publication may be provided in a variety of formats. For example, an electronic publication may be formatted for physical printing, output in a digital format (e.g., for publication in an electronic-based medium), output in a multi-media format (e.g. employing one or more of text, graphics, photographs, audio, speech, music, video, and so on), or output in some other suitable or otherwise creative manner.

In some aspects, electronic publication management involves: receiving digital content at a server system; storing the digital content; identifying at least one of the sections of the electronic publication within which the stored digital content is to be displayed; associating the stored digital content with the identified at least one section of the electronic publication; and sending at least one message (e.g., request) to invoke concurrent display of the associated digital content and identified at least one section of the electronic publication at a user (e.g., client) device.

In some aspects, electronic publication management involves: receiving a plurality of digital content items at a server system; identifying, for each digital content item, a user associated with the digital content item, wherein the user is identified from a plurality of users authorized to access the electronic publication; identifying, for each user, at least one of the sections of the electronic publication associated with the user; as a result of the identification of each user associated with each digital content item and the identification of each section associated with each user, identifying, for each of the digital content items, one of the sections of the electronic publication within which the digital content item is to be displayed; and sending at least one message (e.g., request) indicating, for each of the identified sections of the electronic publication, which of the digital content items is to be displayed at at least one user device.

In some aspects, electronic publication management involves: receiving, at a server system, requests from an authorized set of users to access an electronic publication; and providing, by the server system, concurrent access to the electronic publication for the users by concurrently providing mutually exclusive access to different sections of the electronic publication to different users of the set, wherein the providing of concurrent access comprises requesting information associated with the different sections of the electronic publication from a database that maintains the different sections as different database entries.

BRIEF DESCRIPTION OF THE DRAWINGS

These and other sample aspects of the disclosure will be described in the detailed description and the claims that follow, and in the accompanying drawings, wherein:

FIGS. 11A-11F are simplified diagrams illustrating sample aspects of web pages and associated functionality that may be employed to support electronic publication management as taught herein;

Figure 1:
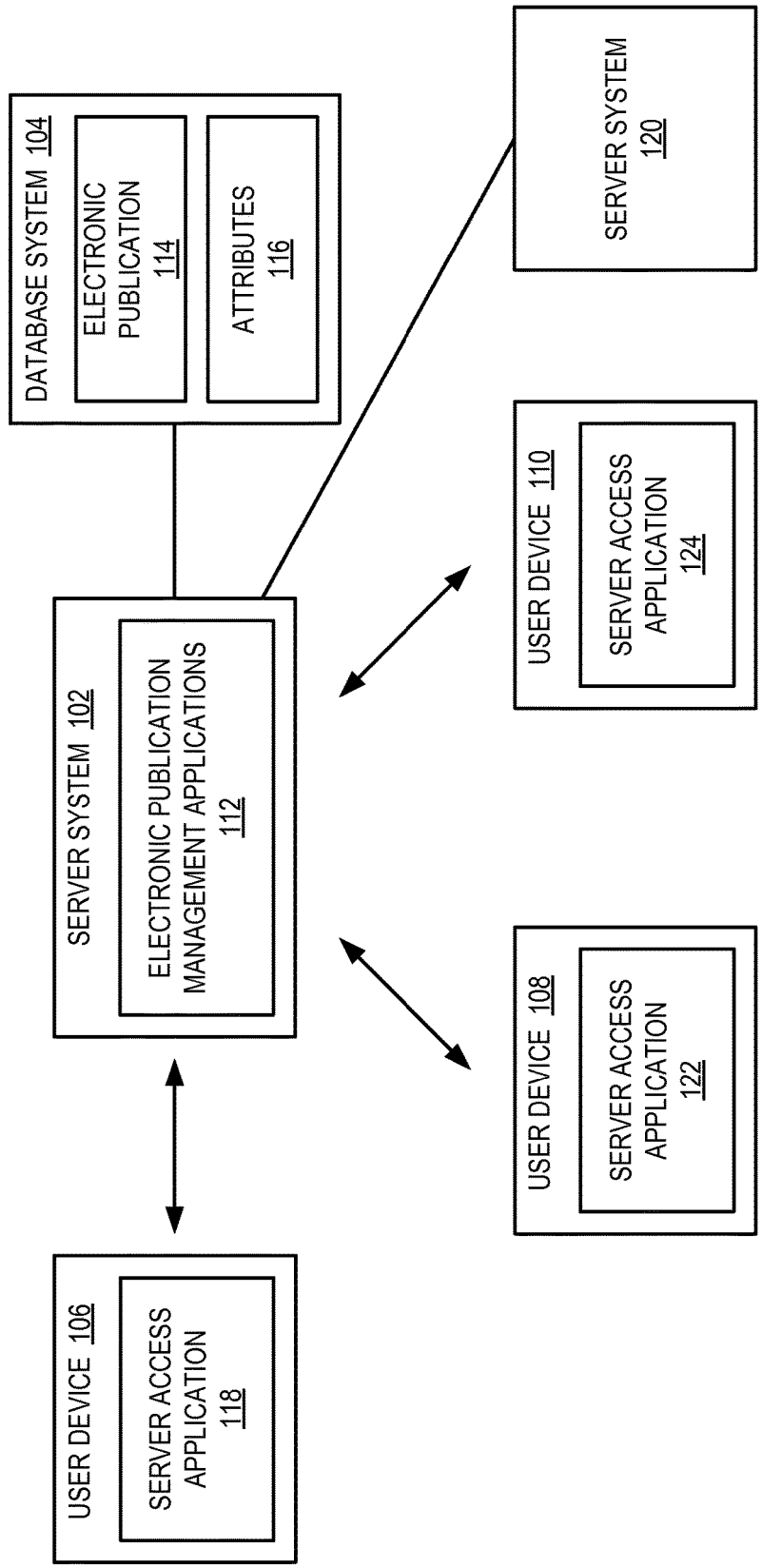
FIG. 1 is a simplified block diagram of several sample aspects of a client-server system configured to enable users to access an electronic publication.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect described herein may comprise at least one element of a claim.

FIG. 1 illustrates an embodiment of a client-server system 100 that supports electronic publication management in accordance with the teachings herein. For purposes of illustration, various aspects of the disclosure are described in the context of one or more user devices (e.g., clients), server systems, and database systems that communicate with one another. It should be appreciated, however, that the teachings herein may be applicable to other types of apparatuses or other similar apparatuses that are referenced using other terminology.

A server system 102 hosts server applications 112 to support electronic publication management. For example, one or more of these applications may enable an author to create and define attributes of electronic publications and documents. In addition, one or more of these applications may enable users to edit and publish electronic publications.

The server system 102 may take different forms in different embodiments. For example, the server system 102 may comprise a single server (e.g., an application server), several local servers, or distributed servers. In some implementations, the server system 102 may comprise a set of applications (e.g., computer programs, etc.) running on a processing system (e.g., one or more computers). In some implementations, the server system 102 may comprise a client-server system. In some implementations, the server system 102 may comprise a cloud-based server system. In some implementations, the server system 102 may comprise a database system.

A database system 104 stores various information associated with the electronic publications managed by the system 100. For example, the database system 104 maintains the electronic publications 114 and attributes 116 (e.g., permissions) associated with each of the electronic publications.

The database system 104 may take different forms in different embodiments. For example, the database system 102 may comprise a single database, several local databases, or distributed databases. As another example, the database system 102 may comprise a set of applications (e.g., computer programs, etc.) running on a processing system (e.g., one or more computers). As yet another example, the database system 102 may comprise a set of applications (e.g., computer programs, etc.) running on a server system. For example, the database system 104 may be implemented at the same entity or entities as the server system 102 (this configuration is not shown in FIG. 1).

A creator author (hereafter referred to as the creator) using a user device 106 (e.g., using a server access application 118 such as a web browser) invokes an application on the server system 102 to create an electronic publication and specify attributes (e.g., defined sections, authorized authors, etc.) for the electronic publication. For example, upon accessing a designated main web page hosted by the server system 102, the creator may access additional web pages that enable the author to create the electronic publication and perform various operations relating to that electronic publication as discussed herein.

Figure 2:
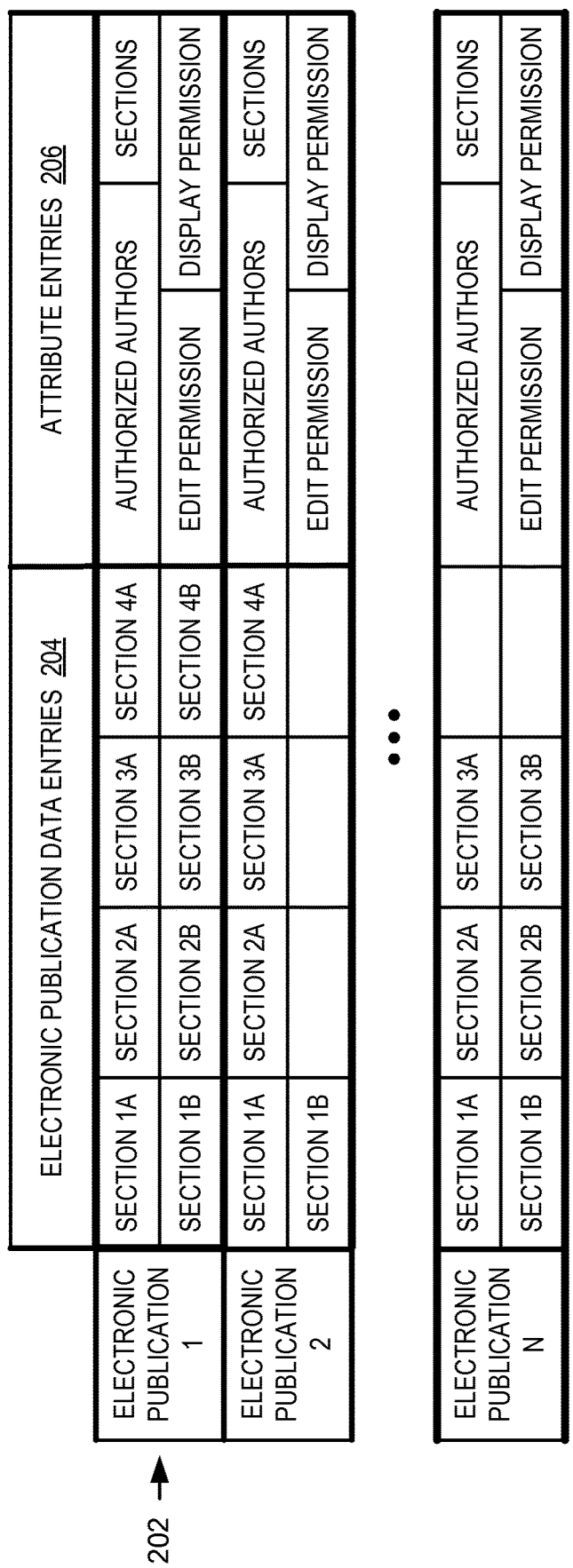
FIG. 2 is a simplified diagram of an example of database information.

The server system 102 cooperates with the database system 104 to create the electronic publication. For example, the server system 102 may instruct the database system 104 to create a database object for the electronic publication that includes different database entries for each of the defined sections, and entries for the attributes of the electronic publication. FIG. 2 illustrates a simplified example of a database that maintains different database objects 202 for different electronic publications, where each database object 202 includes different data entries 204 for each of the defined sections, and entries 206 for the attributes of the electronic publication.

Once the electronic publication is created, the creator may inform any authorized non-creator authors (hereafter referred to as authors) that they may access the electronic publication. For example, the creator may use the user device 106 (e.g., using a web browser) to invoke an application on the server system 102 that sends a message to the authors (e.g., via a messaging application) or posts a message for the authors (e.g., presented to the authors when they log into the system).

The example of FIG. 1 illustrates two authors accessing the electronic publication via respective user devices 108 and 110 (e.g., using server access applications 122 and 124). For example, a first author uses the user device 108 (e.g., using a web browser) to invoke an application on the server system 102 that indicates which electronic publications and documents that author is allowed to access and provides tools to enable the author to edit and publish the electronic publication.

In accordance with the teachings herein, the creator may have given the first author authorization to access only a subset of the sections of the electronic publication. To this end, the server system 102 cooperates with the database system 104 to control access to the different sections of the electronic publication. For example, based on the attributes stored in the database system 104 for the electronic publication, the server system 102 may only present to the first author (e.g., via a web page) the designated subset of the sections.

As discussed in more detail below, authorization may take various forms. For example, a given author may only be allowed to edit certain sections, view certain sections, print certain sections, and so on.

In accordance with the teachings herein, the system 100 may provide concurrent access to the electronic publication to different authors. For example, the first author may request access to one section of the electronic publication concurrently with a request by the second author to access another section of the electronic publication. As shown in FIG. 2, the database system 104 may maintain a database 200 that stores different sections of the electronic publication as different database entries (e.g. 2A, 4B, etc.). Hence, the database system 104 is able to provide concurrent access to these different sections of the electronic publication. Consequently, the server system 102 may cooperate with the database system 104 to provide concurrent access to the different sections.

A user device (e.g., user devices 106, 108, and 110) may take different forms in different embodiments. For example, a user device may comprise a computer (e.g., a personal computer), a cell phone, a smart phone, a tablet, an entertainment device (e.g., a mobile device or a home or office device), and so on.

In some embodiments, the server system 102 communicates with at least one other server system (represented by a server system 120 in FIG. 1). For example, the server system 102 may receive digital content from the server system 120 to be included in an electronic publication as well as document.

Figure 3:
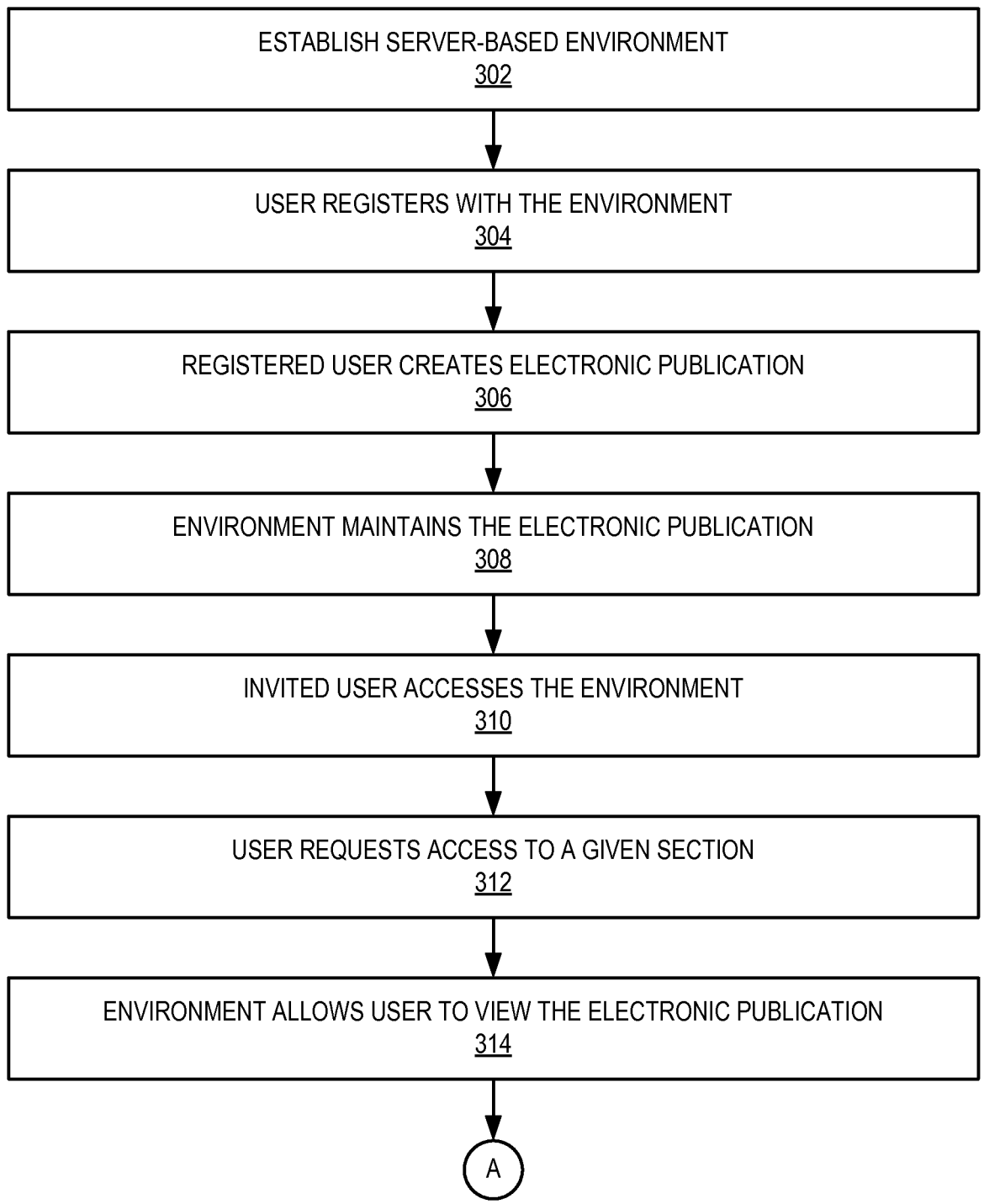
FIGS. 3 and 4 are a flowchart of several sample aspects of operations that may be performed to create, edit, and publish an electronic publication.

Referring now to FIG. 3, an example of a non-linear electronic publication production and management process from point of creation to publishing (e.g., an electronic publication process) will now be described to illustrate several of the innovative concepts that may be employed in conjunction with the teachings herein. For convenience, the operations of FIG. 3 (or any other operations discussed or taught herein) may be described as being performed by specific components. It should be appreciated, however, that these operations may be performed by other types of components and may be performed using a different number of components. It also should be appreciated that one or more of the operations described herein may not be employed in a given implementation.

As represented by block 302, a server-based environment is established (e.g., at a client server or some other suitable serving entity) in a manner that enables authors, other content providers, and other users to access an electronic publication. Typically, the environment is accessed via a web browser. However, other mechanisms (e.g., a file transfer protocol (ftp) or some other suitable applications) may be employed to gain access to the environment (e.g., to access information managed by the environment, or to provide access to information used by the environment).

As represented by block 304, when a user (author) wishes to create an electronic publication for the first time, the user registers with the environment. For example, the user may access a registration web page and fill out the requested information (and, in some cases, pay a fee).

As represented by block 306, a registered user may then create an electronic publication (e.g., by accessing another web page or tab). This user is deemed the main author of the electronic publication and may select the format of the electronic publication, may specify the authors allowed to access the electronic publication, may specify the section(s) that a given author is allowed to access, may specify advertising for the electronic publication, and so on. To support these actions, the environment enables the user (e.g., the main author or any other author) to: create and manage (e.g., add, edit, delete) lists of content providers, lists of content (e.g., templates), lists of authors, lists of advertisers, sources for shared information (e.g., importing sources); to specify destinations for information from the current electronic publication that is allowed to be shared; to inform authors that they are authorized to access an electronic publication (e.g., invite authors to help create the electronic publication); and so on. As an electronic publication is being created, a user may thus easily designate the format of the electronic publication and the content sources (e.g., authors, importing content sources, defined (e.g., pre-defined) templates, static and dynamic advertisements, etc.) to be included in the electronic publications and documents.

As represented by block 308, the environment maintains the electronic publication in a format that readily facilitates the creation, accessing, editing, and publishing operations taught herein. In some implementations, the environment maintains the electronic publication in an extensible markup language (XML) format.

As represented by block 310, an invited user may access the environment (e.g., after using a web browser to register with and login to the environment) at any time to assist in the creation of a designated electronic publication. For example, upon logging in, a user may be presented with (e.g., via a designated web page or tab) a list of those electronic publications for which the user has been granted access. For a given one of these electronic publications, the user also may be presented with (e.g., via another web page or tab) a list of the sections that the user is authorized to access.

As represented by block 312, when a user requests access to a given section (e.g., by clicking on a corresponding field), the environment provides access control to ensure that the user is accessing an authorized section. Upon successful authorization, the user is allowed to edit the section (e.g., through the use of web pages presented to the web browser). For example, the user may: select one or more templates (e.g., book covers, chapter pages, etc.) to be used for the electronic publication; type text into designated (e.g., author designated) text fields or other areas of a section; import photographs or other images (e.g., graphics) into designated image fields or other areas of a section, import audio (e.g., speech or music) into designated audio fields or other areas of a section, import video into designated video fields or other areas of a section, import application-based content (e.g., drag and drop-in mini-applications) into designated application fields or other areas of a section, import advertisement information into designated advertisement fields or other areas of a section, and so on.

As represented by block 314, in conjunction with accessing a given electronic publication, the environment allows a user to view the electronic publication. For example, the environment may present the electronic publication to the user (e.g., by sending appropriate messages to the web browser) in the same format as will be used when the electronic publication is printed. In some cases, through the access control, the environment only allows a given user to view those sections that the user is authorized to access.

Figure 4:
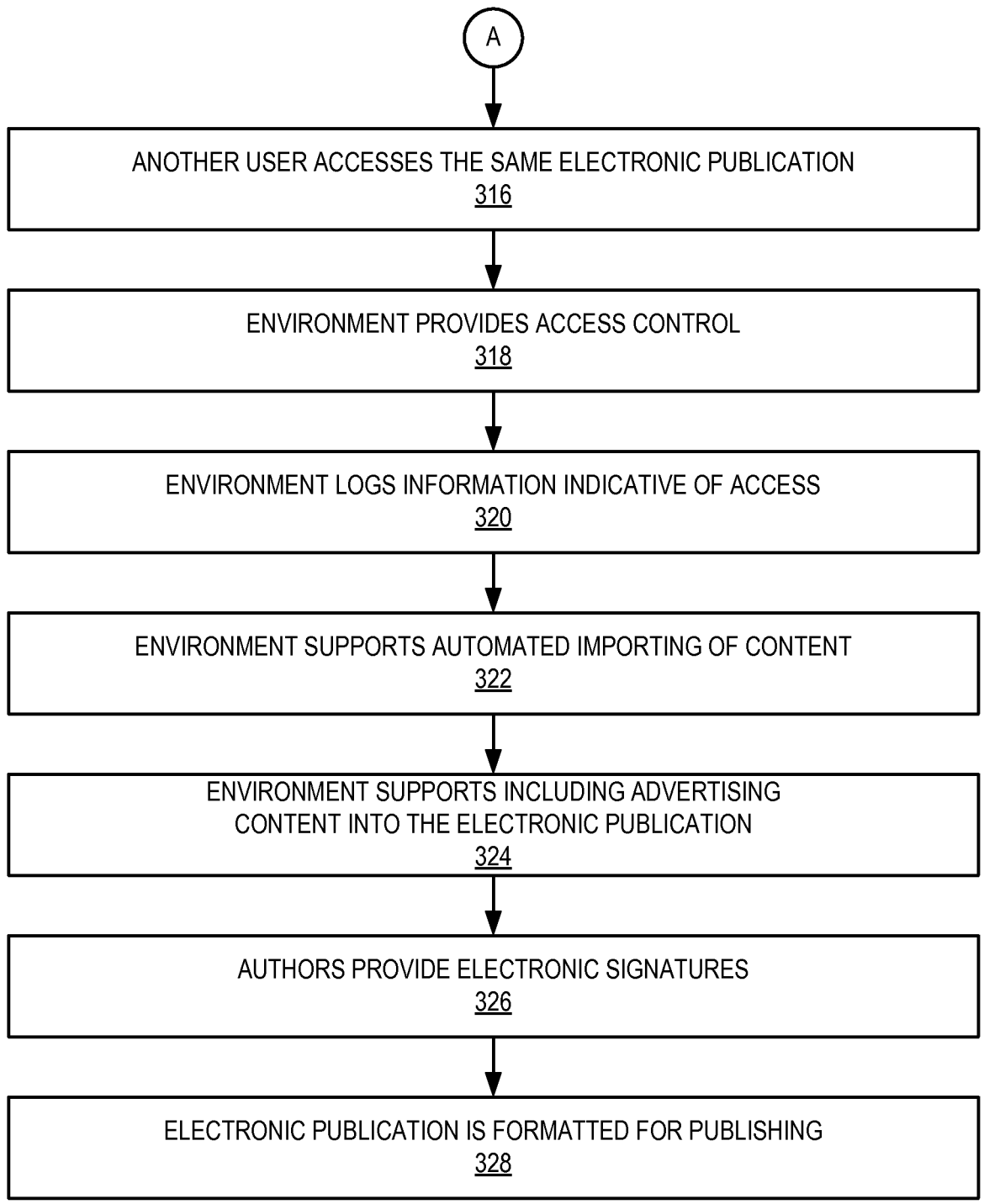

As represented by block 316 of FIG. 4, concurrent with the actions of one user, another user may access the same electronic publication. Here, upon accessing the environment, this other user is presented with those sections of the electronic publication that he or she is allowed to access. The other user is then free to access any of the authorized sections, provided the section is not already being accessed by another user.

As represented by block 318, in the event multiple users are authorized to access the same section of the same electronic publication, the environment provides access control to prevent simultaneous use of a given section by multiple users. Here, once a first user gains access to that section, any subsequent attempts by other users to gain access are disallowed until the first user relinquishes access to the section.

To support concurrent access of a single electronic publication by multiple users, the environment maintains the electronic publication in a database (e.g., as part of the client server or as a separate entity) whereby different sections comprise different database entries. For example, the electronic publication may be stored using a structured query language (SQL) database. When a user requests to access a particular section, the environment (e.g., by operation of the database) checks out that section to prevent conflicting access to that section. Once the user relinquishes access to that section, the environment checks the section back in to allow other users to access the section. However, the database does permit concurrent access to different database entries (sections). That is, different sections of the same electronic publication may be checked out at the same time.

As represented by block 320, in conjunction with each access of a given section, the environment logs information indicative of that access. For example, a log may be maintained that indicates one or more of: the times at which a given section was accessed, the user who accessed the section, the type of access (e.g., create, edit, delete), an indication of how the section was changed (e.g., by recording a "snapshot" of a section), or other access-related information.

As represented by block 322, as mentioned above, the environment supports automated importing of content. For example, a user may designate information (e.g., user generated information) to be imported into a publication from a local environment (e.g., a local server), another environment (e.g., another server), or some other digital content source. Here, source information may be input by the user into designated fields in the environment (e.g., as presented on a web page). This information may be designated for one time use or for use for any of the author's work or, in some cases, for use by others (e.g., the author authorizes sharing of the information to other authors and/or to third parties). As a specific example, a user may designate certain information (e.g., certain fields of information, thoughts from the ThoughtSpace) that is to be imported from designated social media accounts (e.g., Facebook, Twitter, or LinkedIn) or the ThoughtSpace and then incorporated into a specified section (e.g., a specified field or fields within a section) of a specific electronic publication (or all of the author's electronic publications).

As represented by block 324, also as mentioned above, the environment supports mechanisms to include advertising content into the electronic publication. For example, a user may designate certain advertising information (e.g., maintained by the environment and accessible via a web page) to be included in a designated section of the electronic publication. In some cases, this information is designated as being imported from a local environment, another environment (e.g., an ad server, third party application, third party site), or some other digital content source. The user may then designate the manner in which the advertisement information is to be displayed in the electronic publication. In some cases, advertisements are presented to authors. In some cases, advertisements are presented to end-users (e.g., readers). In some cases, one or more criterion is used to designate whether and/or how an advertisement is to appear in an electronic publication. For example, advertisements may be presented less frequently (or not at all) to paying end-users. As another example, less expensive advertisements may be presented less frequently than advertisements that are more expensive.

The timing of the display of an advertisement may be defined in various ways. In some cases, a user specifies that an advertisement be displayed according to a defined periodicity (e.g., every 5 minutes). In some cases, a user specifies that an advertisement be displayed according to defined events (e.g., every 10 pages turned by a user).

Advertisements may be presented in a variety of ways. In some cases, a user specifies that an advertisement is to be displayed in a stationary manner (e.g., at the bottom of a designated page). In some cases, a user specifies that an advertisement is to be displayed as a pop-out. In some cases, a user specifies that an advertisement is to be displayed as a floating advertisement.

As represented by block 326, in some implementations, authors are able to provide electronic signatures (e.g., digital signatures) for the electronic publication. The system (e.g., a server) may include such an electronic signature in the electronic publication. For example, for each author of an electronic publication, a corresponding electronic signature may be included in the electronic publication. In some cases, an electronic signature may be provided for each amendment made to an electronic publication to provide verification that the amendment is by an authorized user. An electronic signature may be provided in various ways. In some implementations, an electronic signature is provided via a third party service (e.g., that verifies the authenticity of the electronic signature). In some aspects, an electronic signature is provided by inserting the author's signature (e.g., an artwork representation of the author's signature, a clipart, etc.) into the electronic publication. In either case, the system (e.g., server) may store this signature information and/or provide a convenient mechanism (e.g., drag-and-drop, point-and-click, etc.) for the author to insert an electronic signature into an electronic publication or otherwise provide the electronic signature with the electronic publication. In this way, the electronic signature may be distributed in the same fashion as the electronic publication.

As represented by block 328, once an electronic publication has been completed (or at some point prior to final completion, if desired), the electronic publications may be submitted for digital publishing or formatting for print publishing. For example, an electronic publication may be output in PDF format and sent to a printer (e.g., for physical printing) or sent to an electronic publisher (e.g., for digital publication like www.Bonzoi.com).

With the above in mind, additional details relating to associating digital content with sections of an electronic publication, associating users (e.g., authors) and digital content, and providing concurrent access in the context of electronic publication management will be described with reference to FIGS. 5-7. As discussed herein, in some embodiments, the electronic publication comprises an interactive electronic book where each section of the electronic publication comprises a chapter of the interactive electronic book. The electronic publication may take other forms in other embodiments as discussed herein.

Figure 5:
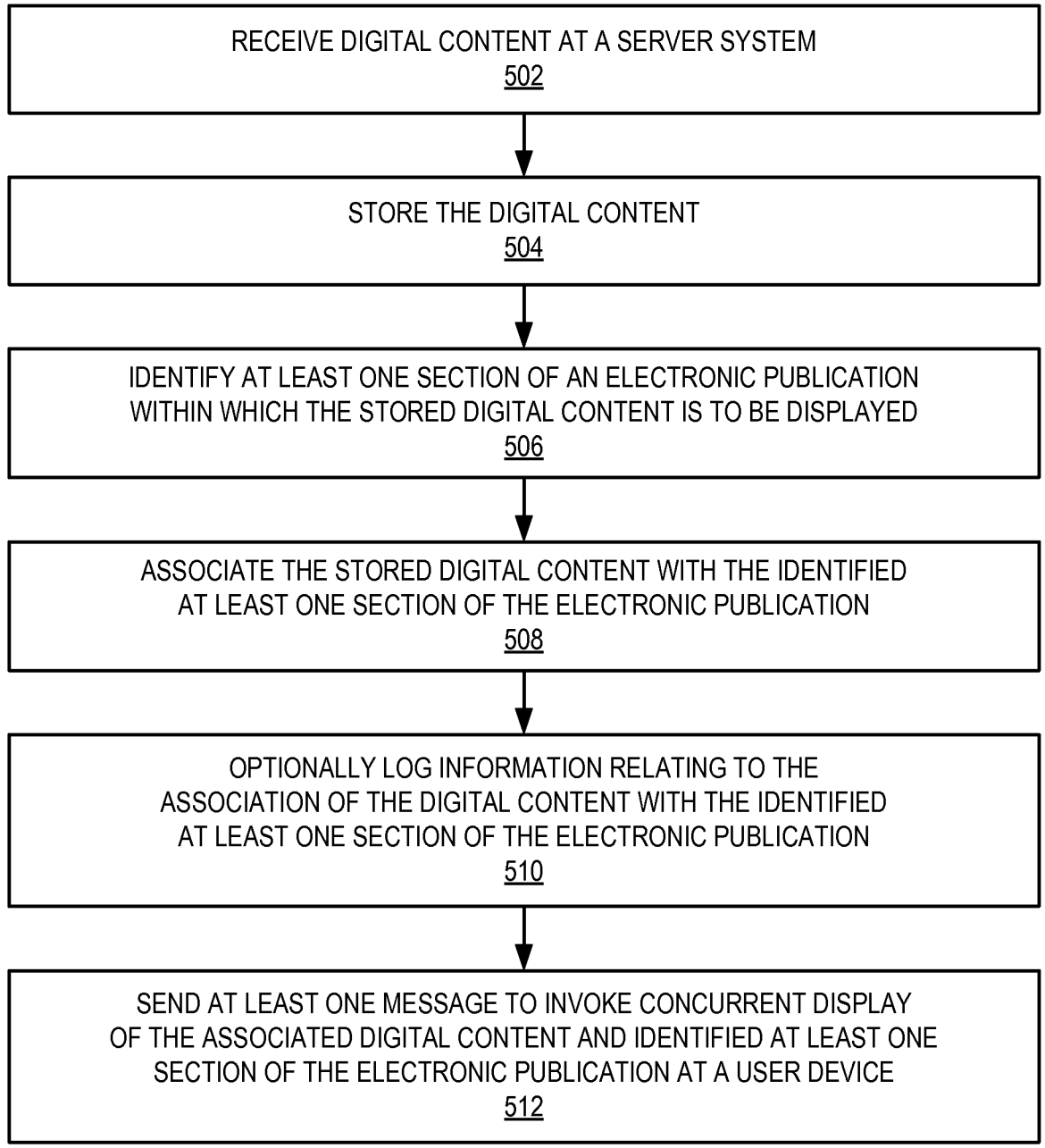
FIG. 5 is a flowchart of several sample aspects of operations that may be performed to associate digital content with sections of an electronic publication.

FIG. 5 illustrates an example of operations that may be performed (e.g., by a server system and/or a database system) to associate digital content with sections of an electronic publication.

As represented by block 502, a server system receives digital content (e.g., user created digital content from a user device). For example, a user may access a web page hosted by the server system that allows the user to store digital content (e.g., ThoughtSpace content) on one or more of: the server, an associated database, or some other memory component. This web page also may enable the user to create the digital content at the server system and specify that the digital content is to be displayed with a particular section of an electronic publication. In some cases, the digital content comprises advertisement information.

In some embodiments, the reception of the digital content comprises: receiving information importing parameters designated for the electronic publication; and using a first one of the parameters to acquire, from another server system, information to be associated with the electronic publication. In some cases, the first one of the parameters indicates least one type of information to be imported from the other server system. In some cases, a second one of the parameters indicates at least one field of the electronic publication into which the received information is to be incorporated.

As represented by block 504, the server system stores the digital content. For example, the digital content may be stored locally or remotely (e.g., in a database).

As represented by block 506, the server system identifies at least one of the sections of the electronic publication within which the stored digital content is to be displayed. In some aspects, the identification of the at least one section comprises retrieving an indication associated with the stored digital content from a database, wherein the indication identifies the at least one section. In some aspects, the identification of the at least one section comprises: identifying a user associated with the digital content, wherein the user is identified from a set of users authorized to access the electronic publication; and verifying that the identified at least one section is associated with the identified user.

As represented by block 508, the server system associates the stored digital content with the identified at least one section of the electronic publication. In some aspects, the association of the digital content with the at least one identified section of the electronic publication comprises updating a database entry for the identified at least one section of the electronic publication.

In some aspects, the association of the digital content with the identified at least one section of the electronic publication comprises specifying at least one condition for displaying the digital content in the electronic publication. In some aspects, the at least one condition may specify how the digital content is to be displayed in the electronic publication (e.g., as a pop-out object, as a rolling over page object, as a floating object, or in some other manner). The at least one condition may specify where the digital content is to be displayed in the electronic publication. The at least one condition may specify when the digital content is to be displayed in the electronic publication. In some aspects, the at least one condition may relate to whether a user is a paying user or a non-paying user.

As represented by block 510, the server system optionally logs information relating to the association of the digital content with the identified at least one section of the electronic publication. For example, the server system may maintain a record that indicates one or more of: when the digital content was associated with each section, where the digital content is to be displayed, when the digital content is to be displayed, under what conditions the digital content is to be displayed (e.g., paid versus non-paid user), how the digital content is to be displayed (e.g., floating object, pop-out object, static object), and so on.

As represented by block 512, the server system sends at least one message (e.g., a request) to invoke concurrent display of the associated digital content and identified at least one section of the electronic publication at a user device. For example, a message may be sent to a client instructing the client to display a section with the specified digital content.

Figure 6:
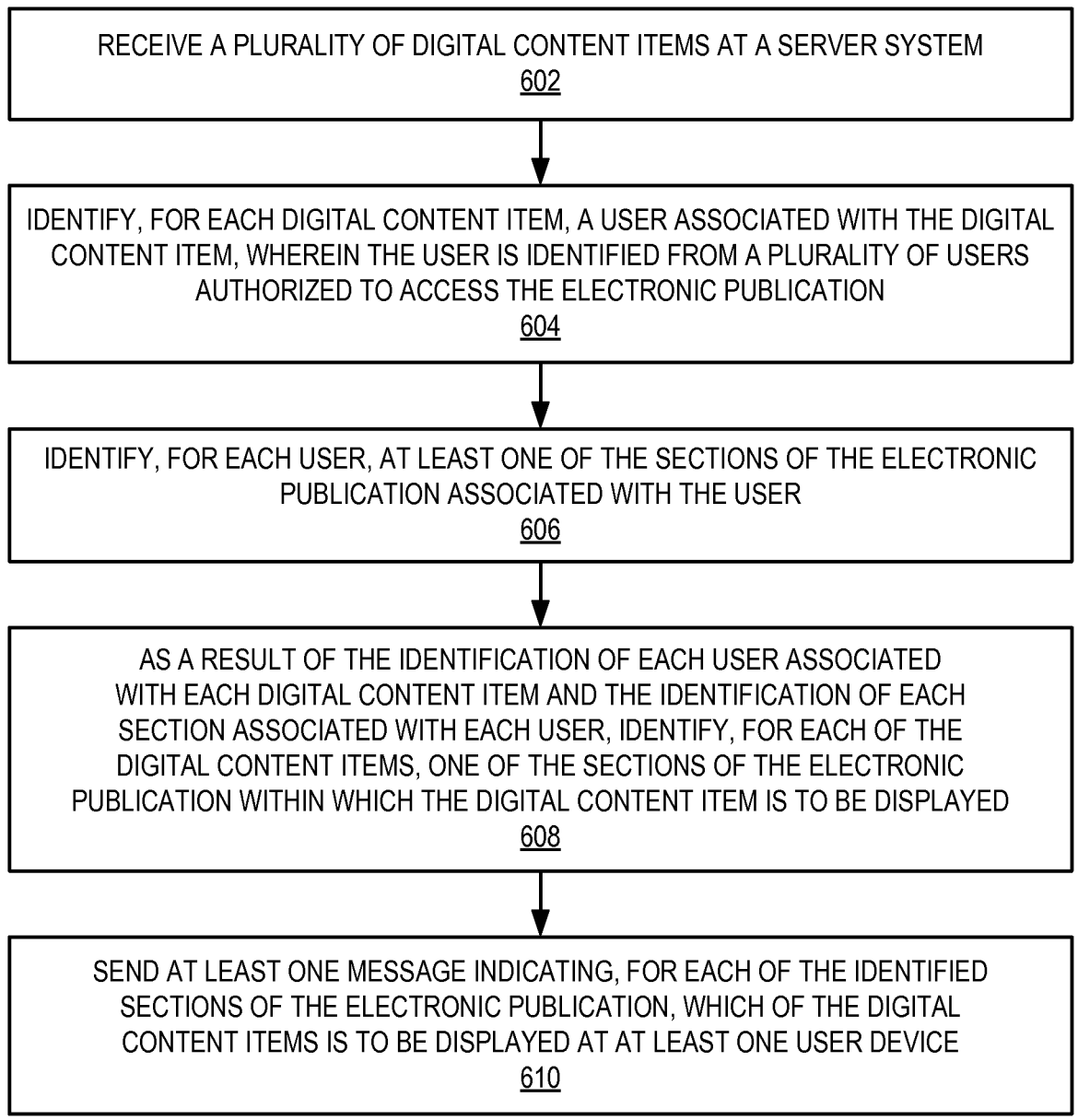
FIG. 6 is a flowchart of several sample aspects of operations that may be performed to associate users and digital content for an electronic publication.

FIG. 6 illustrates an example of operations that may be performed (e.g., by a server system and/or a database system) to associate users and content of an electronic publication.

As represented by block 602, a server system receives a plurality of digital content items. In some aspects, the reception of the digital content items comprises receiving messages comprising the digital content items from at least one user device. Thus, this operation may involve similar operations as described above at block 502. In general, different users will store different digital content with the server system.

In some aspects, each of the digital content items specifies at least one condition for displaying the digital content item in the electronic publication. In some aspects, the at least one condition may specify how a given digital content item is to be displayed in the electronic publication (e.g., as a pop-out object, as a floating object, as a rolling over page object, as a static object, or in some other manner). The at least one condition may specify where a given digital content item is to be displayed in the electronic publication. The at least one condition may specify when a given digital content item is to be displayed in the electronic publication. In some aspects, the at least one condition may relate to whether a user is a paying user or a non-paying user.

As represented by block 604, the server system identifies, for each digital content item, a user associated with the digital content item. Here, each user is identified from a plurality of users authorized to access the electronic publication. For example, the server system may access information stored in the electronic publication database that indicates which authorized user downloaded a given item of digital content.

As represented by block 606, the server system identifies, for each user, at least one of the sections of the electronic publication associated with the user. For example, the server system may access information stored in the electronic publication database that indicates, for a given electronic publication, which sections a given user is authorized to access.

As represented by block 608, as a result of the identifications at block 604 and 606, the server system identifies, for each of the digital content items, one of the sections of the electronic publication within which the digital content item is to be displayed.

As represented by block 610, the server system sends at least one message indicating, for each of the identified sections of the electronic publication, which of the digital content items is to be displayed at at least one user device. In this way, when a given author is editing a section of the electronic publication, the user will be able to see the digital content that the author has specified is to be displayed at that section of the electronic publication. In addition, when a user is viewing the electronic publication, the user will see the digital content that has been associated with a given section by the author(s) of that section.

Figure 7:
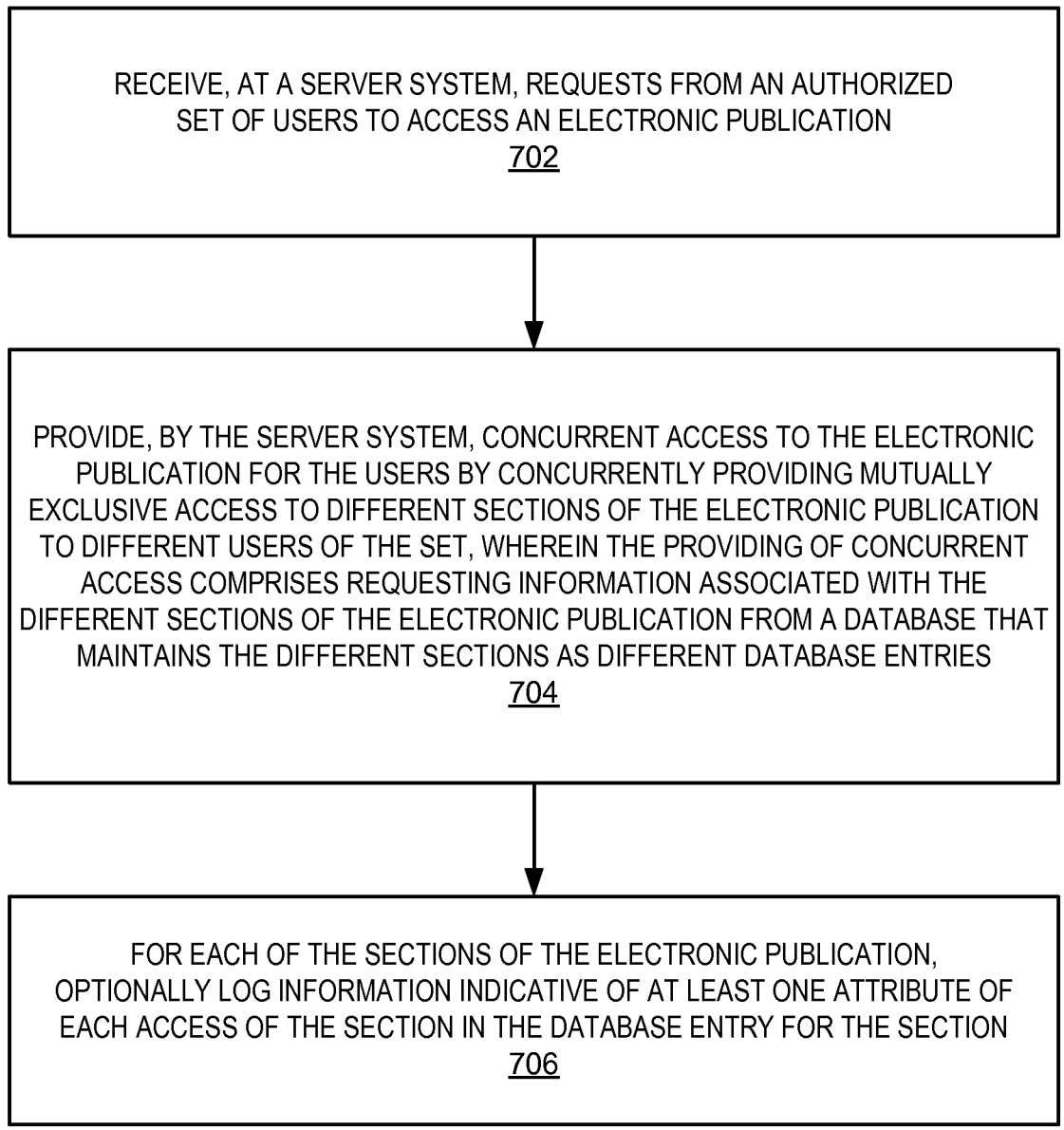
FIG. 7 is a flowchart of several sample aspects of operations that may be performed to facilitate concurrent editing of an electronic publication.

FIG. 7 illustrates an example of operations that may be performed (e.g., by a server system and/or a database system) to facilitate concurrent editing of an electronic publication.

As represented by block 702, a server system receives requests from an authorized set of users to access an electronic publication. In some aspects, the reception of the requests comprises receiving messages from user devices of the users (e.g., as discussed herein).

As represented by block 704, the server system provides concurrent access to the electronic publication for the users by concurrently providing mutually exclusive access to different sections of the electronic publication to different users of the set.

In some aspects, providing concurrent access comprises requesting information associated with the different sections of the electronic publication from a database that maintains the different sections as different database entries as discussed herein.

In some aspects, providing concurrent access comprises determining that a first one of the authorized users is authorized to access a first section of the electronic publication and is not authorized to access a second section of the electronic publication; determining that a second one of the authorized users is authorized to access the second section of the electronic publication and is not authorized to access the first section of the electronic publication; sending a message to display a first section of the electronic publication but not the second section of the electronic publication to a user device of the first authorized user; and sending a message to display the second section of the electronic publication but not the first section of the electronic publication to a user device of the second authorized user.

In some aspects, providing concurrent access comprises maintaining authorization information that identifies, for each section of the electronic publication, at least one of the users that is authorized to access the section; and using the authorization information to determine, for a first user of the set, whether the first user is authorized to access a section of the electronic publication for which the first user requested access.

In some aspects, providing concurrent access comprises checking-out a first one of the sections for exclusive access by a first one of the users; and checking-out a second one of the sections for exclusive access by a second one of the users.

In some aspects, providing concurrent access comprises sending a message to display a section of the electronic publication to a user device of one of the authorized users; and receiving a message from the user device, wherein the received message comprises an instruction to edit the displayed section.

As represented by block 706, for each of the sections of the electronic publication, the server system may optionally log information indicative of at least one attribute of each access of the section in the database entry for the section. These attributes may comprise, for example, the attributes described herein (e.g., timestamps, permissions, indications of changes made, and so on).

Figure 8:
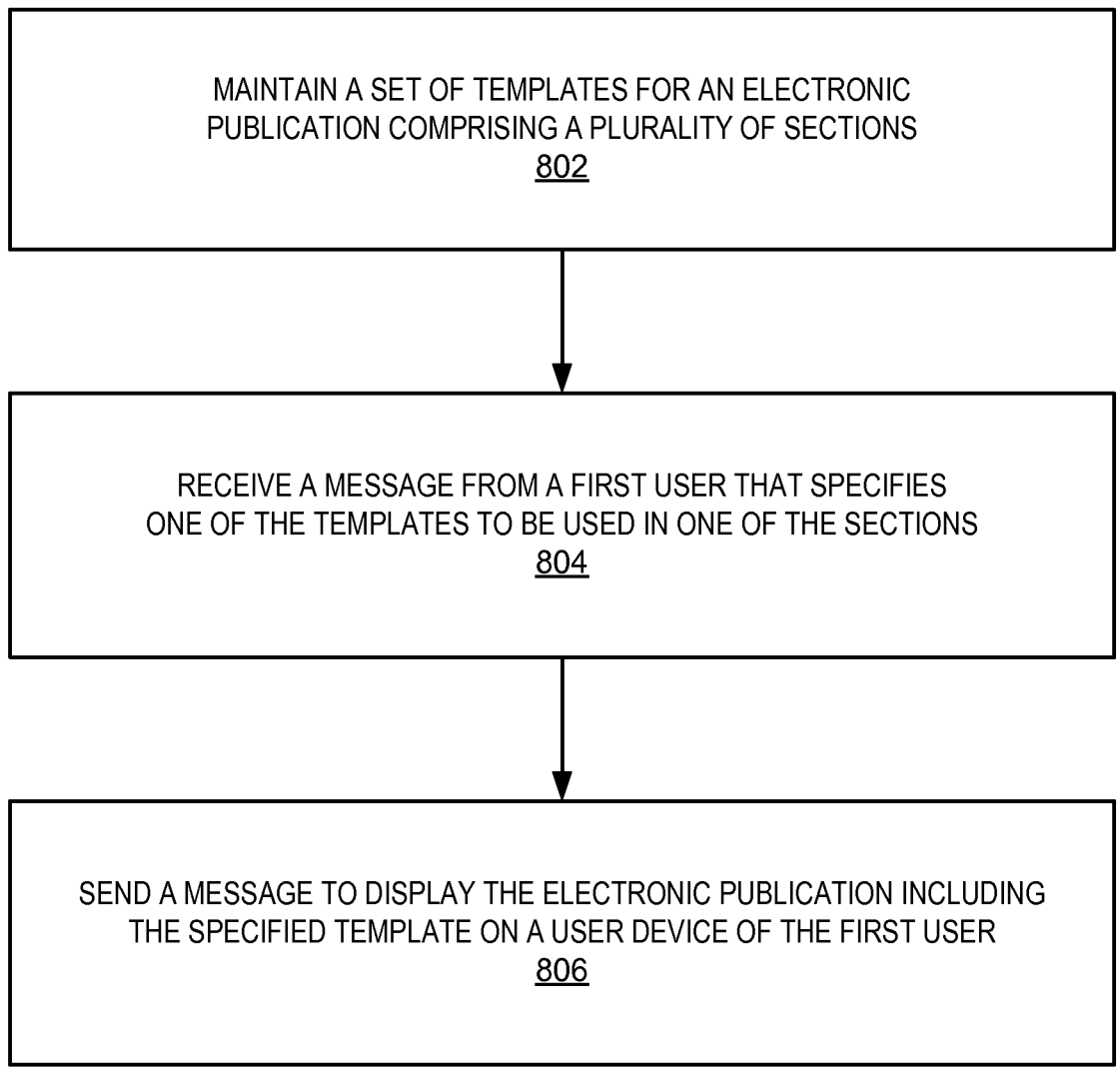
FIG. 8 is a flowchart of several sample aspects of operations that may be performed to use templates with an electronic publication.

FIG. 8 is a flowchart of several sample aspects of operations that may be performed to use templates with an electronic publication. These operations may be employed, for example, in conjunction with the operations of FIG. 5, FIG. 6, or FIG. 7.

As represented by block 802, the server system maintains a set of templates for the electronic publication. For example, the templates may be used specify where certain information is to be placed in certain sections of electronic publications like books, magazines, and journals.

As represented by block 804, the server system receives a message from a first one of the users that specifies one of the templates to be used in one of the sections. For example, a user may advantageously use a template to readily specify that a particular advertisement is to be displayed at the bottom of a particular section.

As represented by block 806, the server system sends a message to display the electronic publication including the specified template on a user device of the first one of the users. Thus, when a user views the electronic publication, the proper digital content (e.g., an advertisement) will appear at the proper location in the document as part of the process of non-linear digital content publishing.

Figure 9:
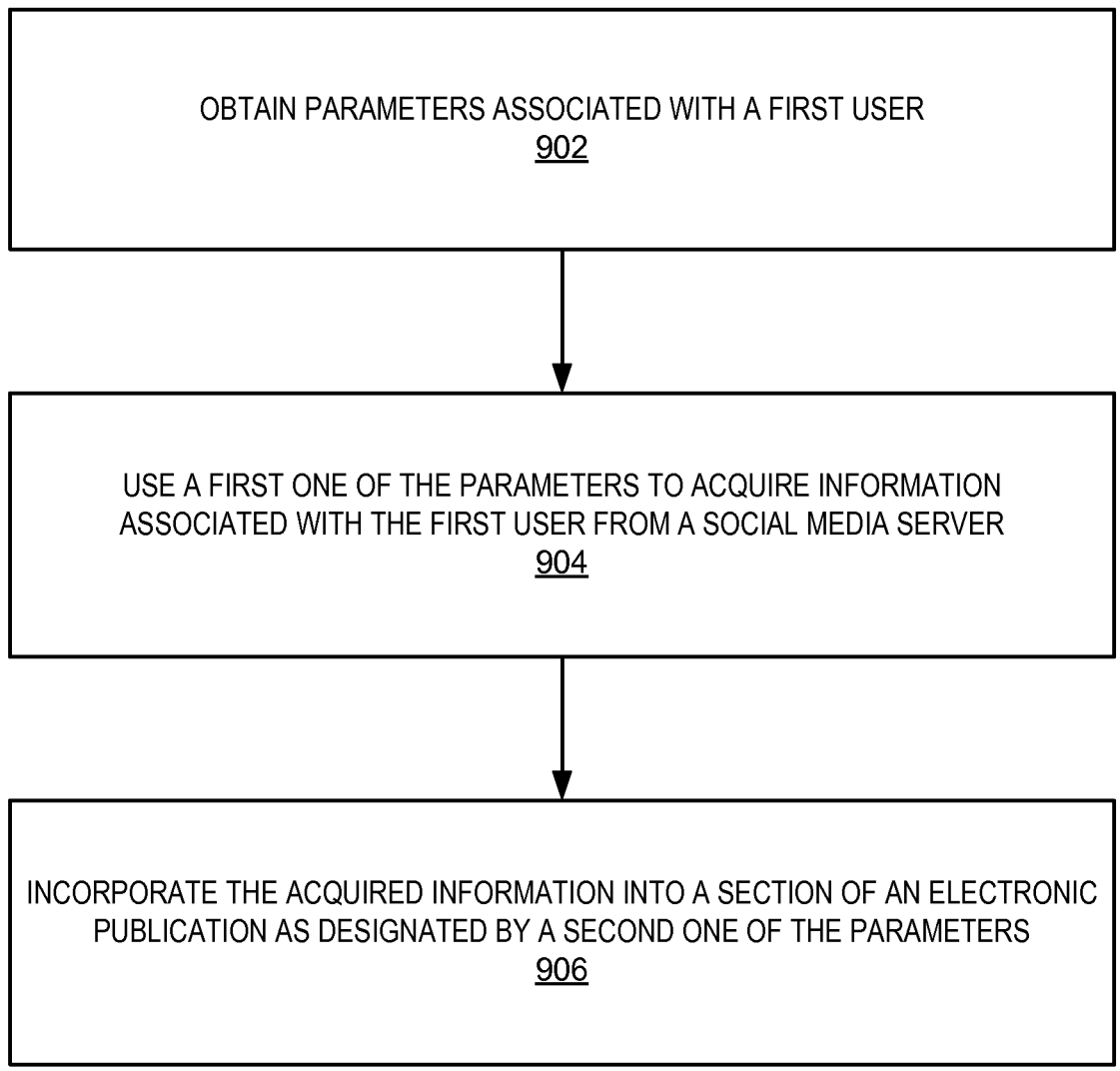
FIG. 9 is a flowchart of several sample aspects of operations that may be performed to incorporate imported information into a sections of an electronic publication.

FIG. 9 is a flowchart of several sample aspects of operations that may be performed to incorporate imported information into sections of an electronic publication. These operations may be employed, for example, in conjunction with the operations of FIG. 5, FIG. 6, or FIG. 7.

As represented by block 902, a server system obtains parameters associated with a first one of the users. For example, as discussed herein, one or more of these parameters may specify where certain digital content associated with the user (e.g., ThoughtSpace content, social media information, etc.) is located. In addition, one or more of these parameters may specify where corresponding digital content is to be placed in an electronic publication.

As represented by block 904, the server system uses a first one of the parameters to acquire information associated with the first user from a designated source (e.g., a ThoughtSpace, a social media server, etc.). For example, the server system communicates with a social media server (designated by one parameter) to import information from fields (designated by another parameter) maintained at the social media server for the user. As another example, the server system retrieves ThoughtSpace content from a storage location designated by one parameter to import information from fields of the ThoughtSpace designated by another parameter.

As represented by block 906, the server system incorporates the acquired information into a section of the electronic publication as designated by a second one of the parameters. In some cases, this may involve the use of one or more templates as discussed herein.

Figure 10:
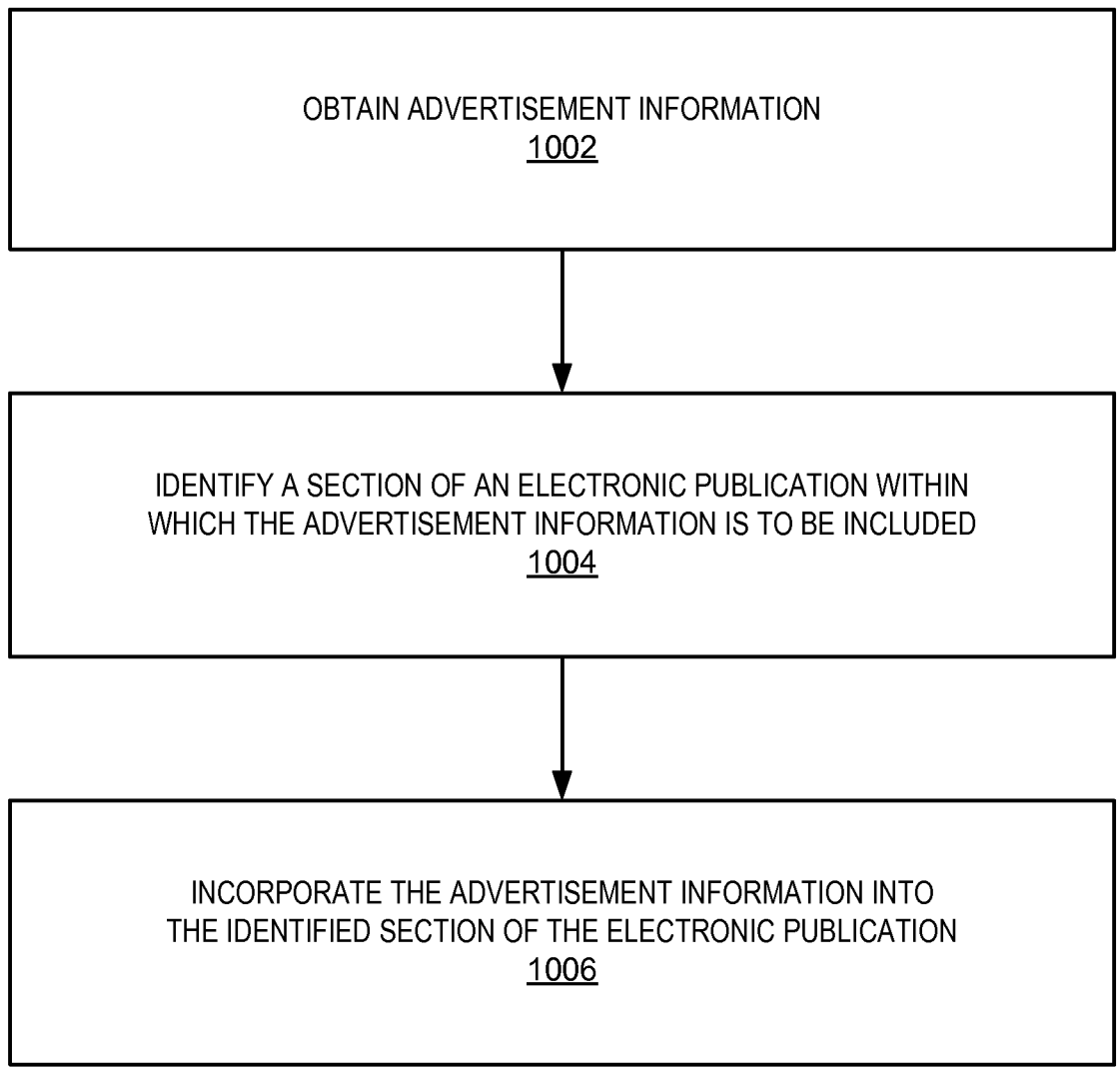
FIG. 10 is a flowchart of several sample aspects of operations that may be performed to incorporate advertising information into sections of an electronic publication.

FIG. 10 is a flowchart of several sample aspects of operations that may be performed to incorporate advertising information into sections of an electronic publication. These operations may be employed, for example, in conjunction with the operations of FIG. 5, FIG. 6, or FIG. 7.

As represented by block 1002, a server system obtains advertisement information. For example, this information may comprise the digital content described in FIGS. 5 and 6, the imported information described in FIG. 9, or some other suitable information.

As represented by block 1004, the server system identifies a section of the electronic publication within which the advertisement information is to be included. For example, as discussed herein, the server system may access information stored in an electronic publication database that indicates how (e.g., where) a user (i.e., an author) has specified that the advertising information is to be placed within the electronic publication.

As represented by block 1006, the server system incorporates the advertisement information into the identified section of the electronic publication. For example, a message (e.g., a request) may be sent to a client instructing the client to display a section with the specified advertisement information.

Figure 11B:
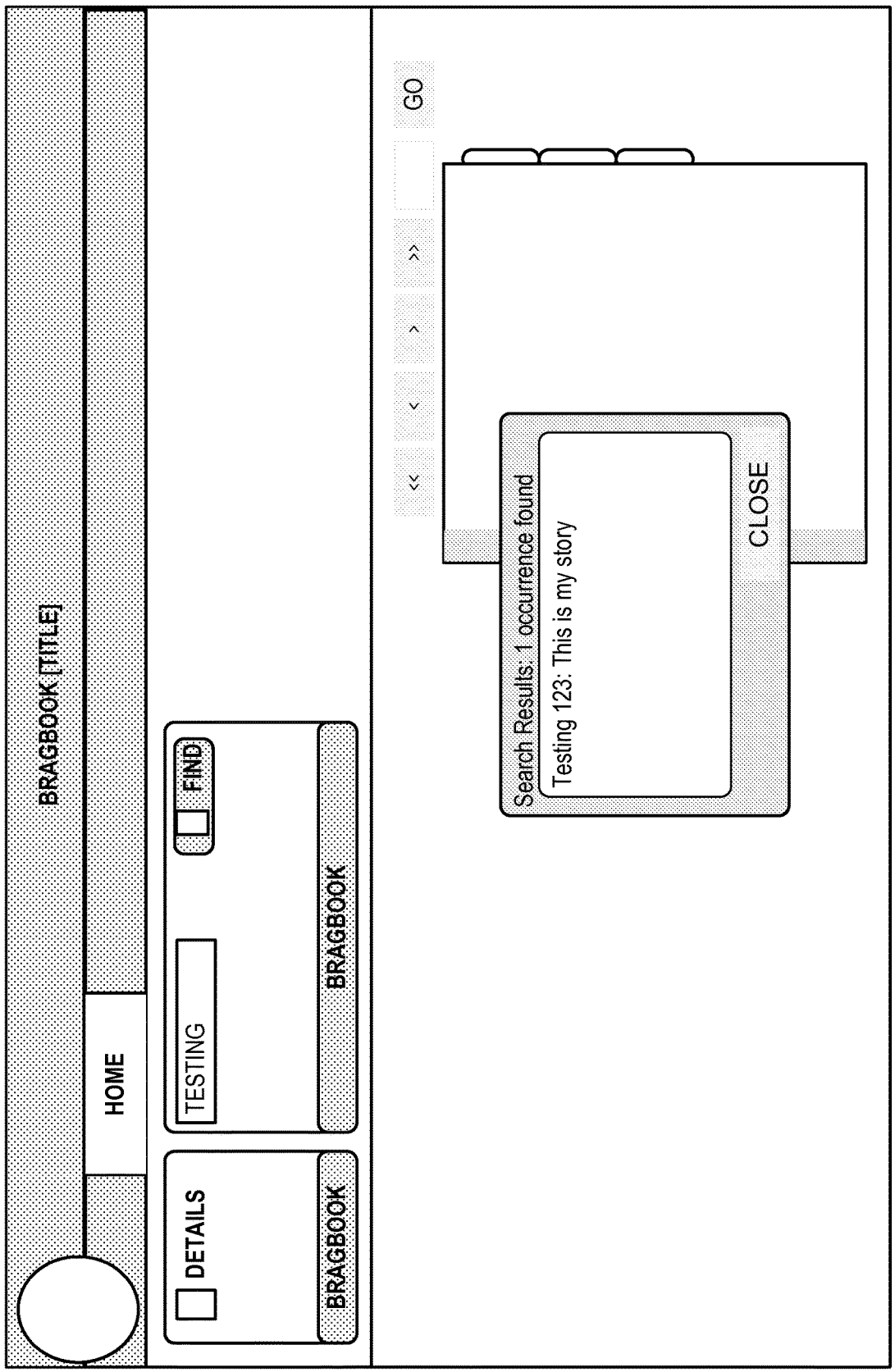
Figure 11C:
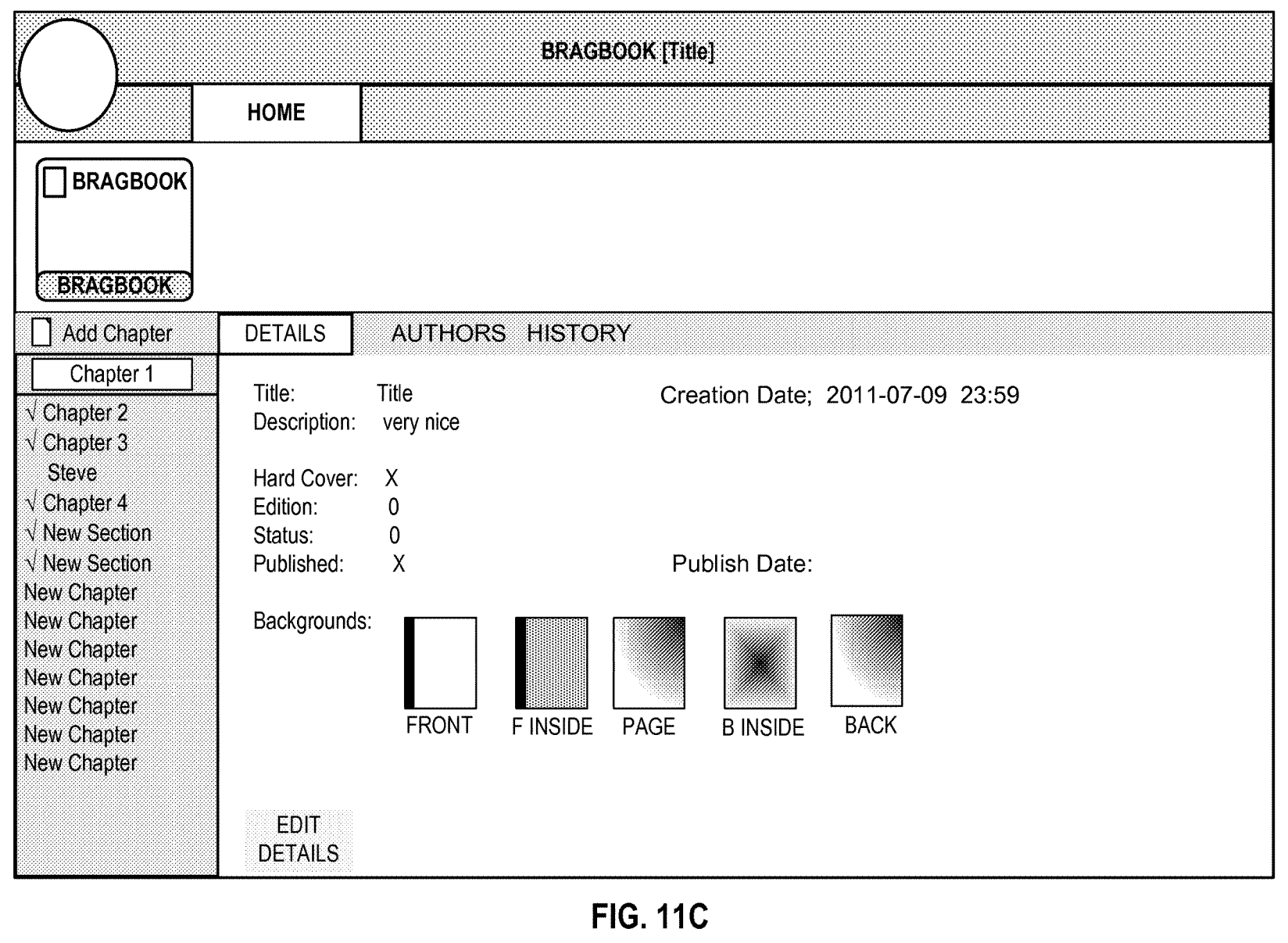
Figure 11D:
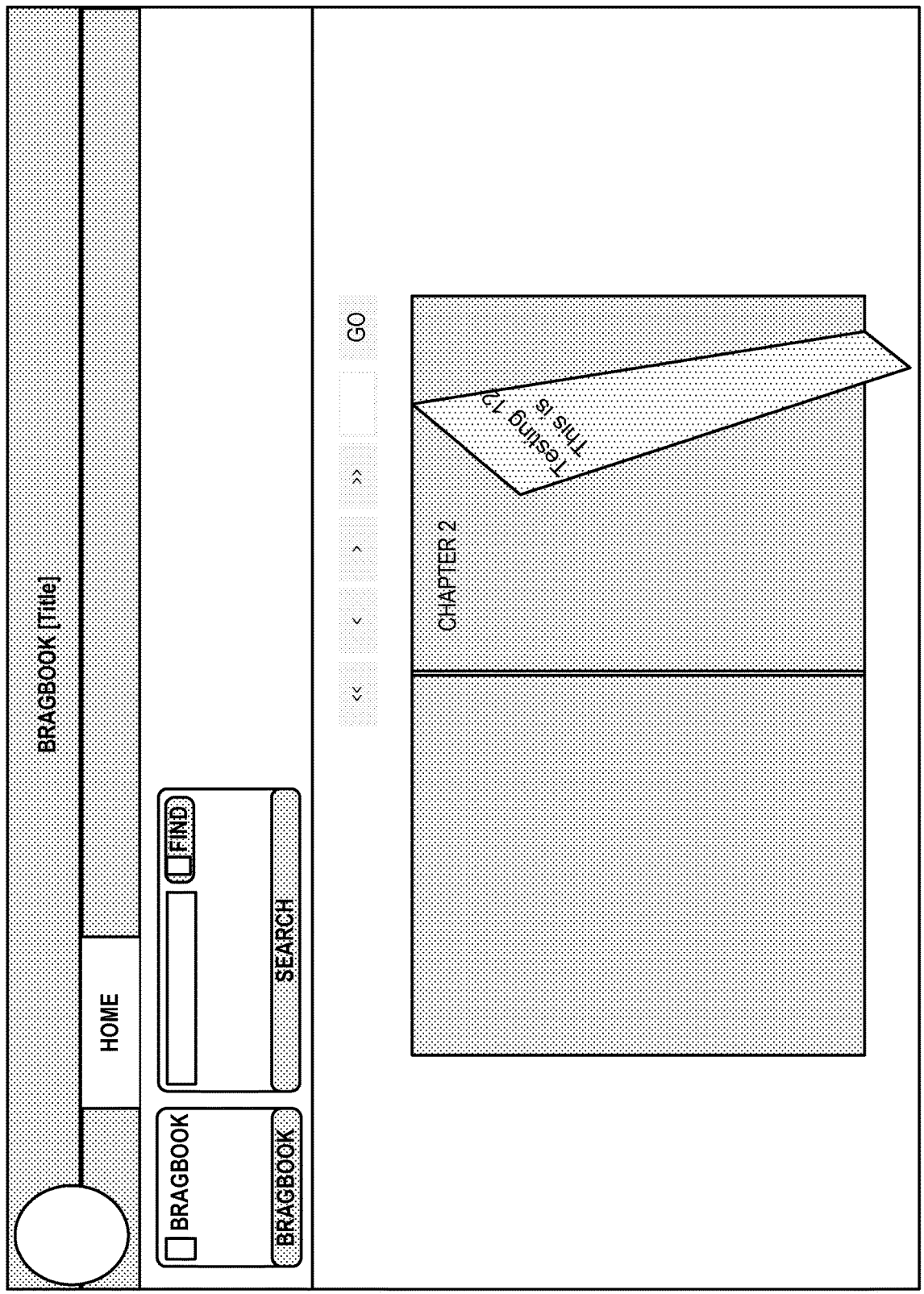
Figure 11E:
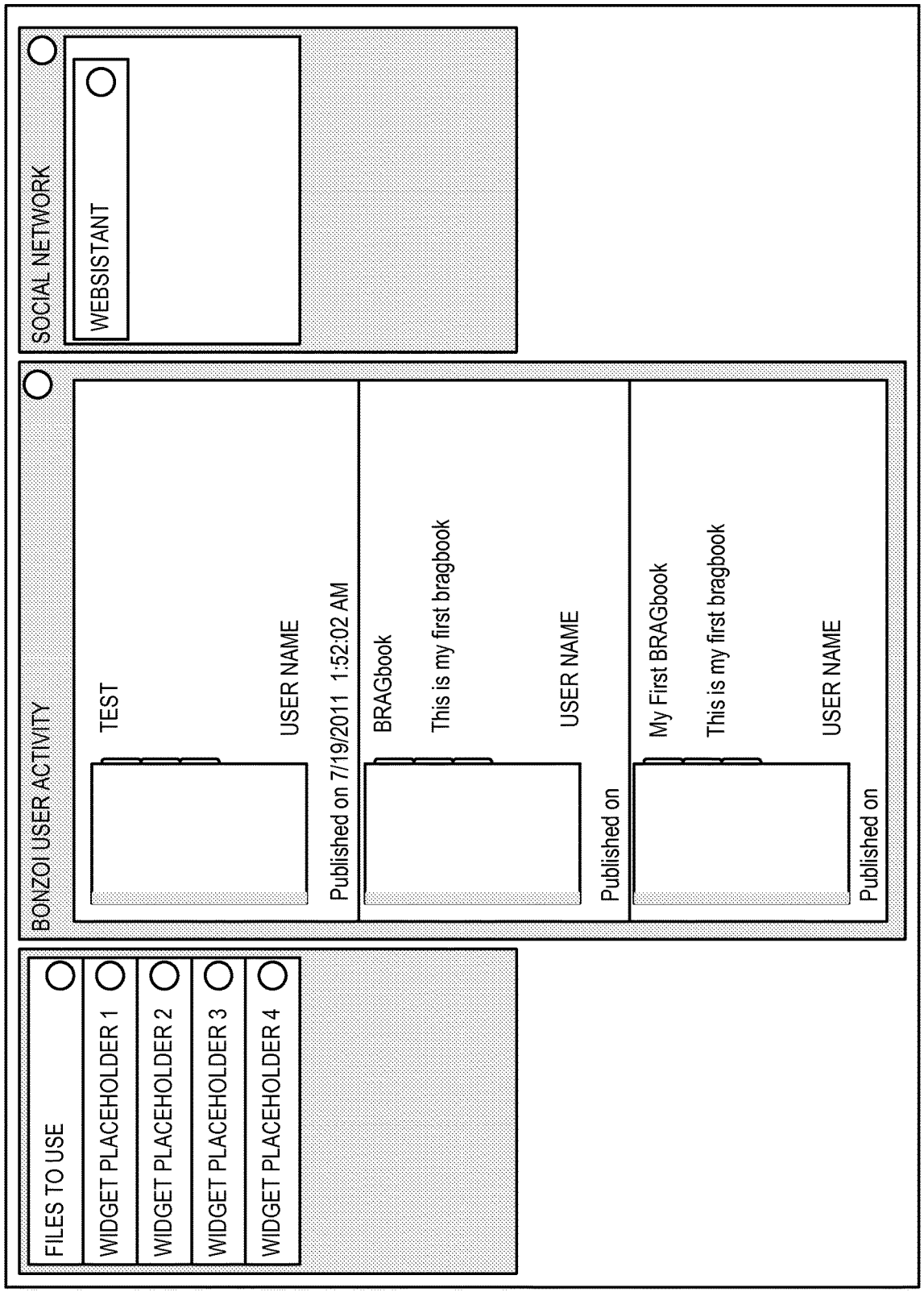
Figure 11F:
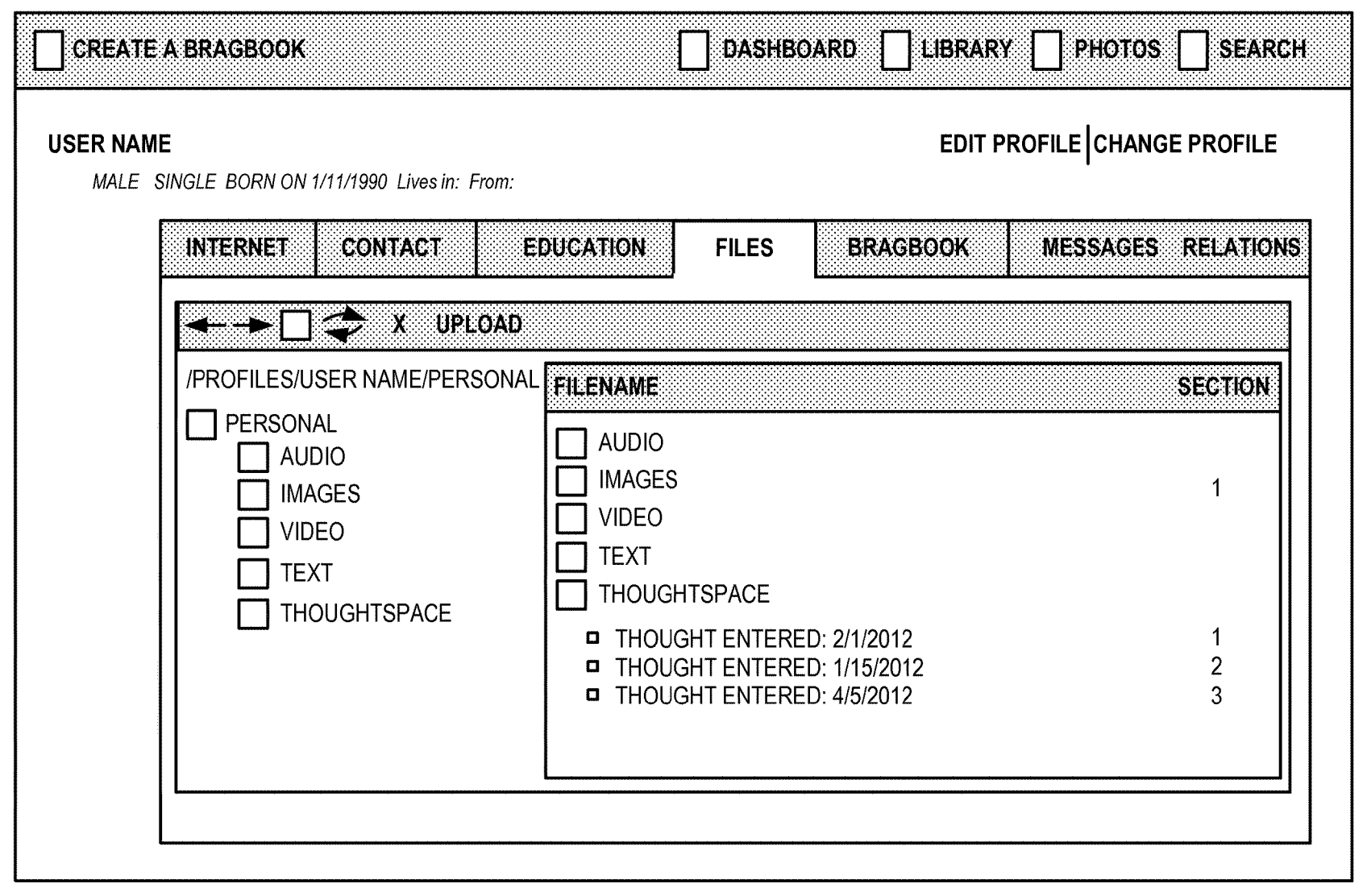

FIGS. 11A-11F describe sample web pages and associated functionality that may be used in one or more embodiments implemented in accordance with the teachings herein. FIG. 11A illustrates an example of a format for displaying user relations (e.g., advertisers, authors, buddies, etc.). FIG. 11B illustrates an example of a format for searching for electronic publications (BragBooks) that a user is allowed to access (e.g., searching for BragBooks that have the word "testing"). FIG. 11C illustrates an example of a format for editing the electronic publication. This editing may comprise, for example, adding new sections, adding new chapters, editing details (e.g., page designs, editions, etc.), managing authors, managing history (e.g., logging), etc. FIG. 11D illustrates an example of a format for editing and viewing the electronic publication in real-time. FIG. 11E illustrates an example of a format for displaying all electronic publications and documents associated with a user. Here, a live area is provided for each publication illustrating in real-time, for example, which users are using which sections of the publication; and illustrating certain aspects of the ThoughtSpace in real-time (e.g., via widgets). FIG. 11F illustrates an example of a format for displaying files (e.g., containing content information such as ThoughtSpace content and attributes such as associated sections) associated with a user.

Additional examples of some of the features and operations that may be employed in an embodiment of an electronic publication environment as taught herein will now be described in more detail.

In some aspects, the environment provides a platform for end-to-end collaborative electronic publication technology and services. The platform may include a cloud-based and database driven content development platform (for purposes of illustration, referred to herein as BragBooks in some cases) and upload-to-use or download-to-use asset management solution (for purposes of illustration, referred to herein as DIGI GLU asset management in some cases). The platform enables enterprise level developers, content distributors and advertisers, as well as all entry level users and publishing house operators with the capabilities to produce, manage and deliver highly engaging and interactive electronic publishing and editing experiences to audiences and co-creators from wherever they are, doing this all simultaneously.

The platform may be utilized, for example, as a "cloud service" over the Internet, through a subscription-based service model, or implemented on-site as a "server application" through enterprise or corporate licensing. Clientele base for the platform may range, for example, from users focused on the collaborative electronic publishing (publications) of private contents and/or public contents, to advertising and marketing interactive corporate content and brand development teams, including collaborative corporate investor presentations, collaborative yearbook projects, and much more.

The platform is used by one, two, or more respective authors/creators inputting and visualizing textual and graphical content with the implementation of, for example: embedded voice-guided reading for language pronunciation and reading impaired uses; along with embedded methods of automation; including importing from social networking and advertising features, simultaneously, between unlimited authors/creators.

Static and trigger multi-purpose and dynamic free form advertisements give the user creative insight and promotional capabilities for their favorite people, brands, publications, places, entertainment, etc.

Advantageously, though the use of the disclosed server-based application environment (e.g., a web site), a creator may instantiate sections into a logically structured Multi-Layer Multi-Author Structured Digitally Published and Print-Ready formatted e-book in a wide variety of categories, with customized covers and pages that can be created and distributed to the users of the environment. Each user has the ability to control his or her own FTP upload server where content can be stored and utilized in any sequence (e.g. a file folder on any server for that user). Likewise, the user has the capability to control multiple contact profiles each one with available fields for website, email, screen names, etc. (e.g. stored within the file folder of that user).

The application environment facilitates simultaneous multi-layer delegated section content editing through the use of scrapbooking tools and techniques to provide interactive content filled e-books available both digitally and via print sources. The environment houses resources for peer-to-peer photo sharing services, namely, electronic transmission of digital photo files among Internet users of the environment. The environment provides an interactive environment featuring technology that allows users to simultaneously create, upload, download, share and sell custom and branded digital documents, namely in the forms of e-books, authored works, yearbooks, graphic novels, and so on.

Simultaneous Multi-Author Multi-Touch Electronic Collaboration on Structured Book (Publishing an Interactive Book)—As discussed above, a single creator or user starts using the platform by creating/personalizing a profile by setting up and approving relations and successively assigns author-author relations as well as main author to author, section (e.g., chapter) delegation. (Main or owner) author/creator can be referred to as both author and creator.

Main (owner) author/creator utilizes the platform (e.g., BragBooks [Author]) to simultaneously create a multi-layer multi-author electronic collaboration for digitally sharing, electronically distributing, and print publishing, developing a structured print-ready e-book through a multi-touch user-friendly interactive live-book visualization of the structured non-linear e-book publication process with capabilities never seen before through the interactive and digitized experience of the content by using a single finger to swipe the pages and flip through the live book.

Through the design studio (e.g. BragBooks [Author]), the Main (owner) author/creator instantiates by allowing the designation of the Main (owner) author/Creator in collaboration with a single or multi-author pool of users where all can simultaneously create and corroborate with one another toward the development of a structured interactive e-book available for export in a multitude of digital and print formats through a publication company (e.g., Bonzoi itself, Third Party Publishers, Indie Publishers, and etc.).

The section usage included with the design studio are check-in and check-out driven modules that save content and respond to previews based on their status. As described, the Main (owner) author/Creator can create and edit a book's section while another collaborating author joins to work on another section in the interactive e-Book or digital publication. Each author may facilitate rapid requests, transmissions, and conveyances of writable text and representable graphics into the visualization modules with direct input into the platform's (e.g., BragBooks [Author]) interactive view.

Utilizing the structured section system, (main or owner) creator/author-delegated sections will become editable content along with a simple method to assign respective authors through the Author tab where a drag and drop panel is provided to easily share authors across sections of each e-book work.

Detail editing of the respective electronic publications and documents (e.g., BragBooks) including an embedded ftp upload folder per user account that the user will utilize to integrate customized covers of books, jackets, backs covers, inside front covers, inside back covers, paper pages, and book jackets, as well as dynamic or static embedded animations (e.g. using DIGI GLU asset management). All these above items are fully visualized through the design studio (e.g. BragBooks [Author]), while both editing, during live publishing, and after public publishing.

Multi-Layer Multi-Format Print-Ready Structured e-book Publishing—is a feature that includes but is not limited to simultaneously creating and publishing a multi-layer digitally published as well as print-ready structured e-book through the integration of sections based on creator-delegated section editing while operating on a check-in and check-out system to help stimulate the non-linear publishing process. The e-books are created and structured by repeating the steps of adding sections checking-in and checking-out the current working sections by the authors.

In this corroborative manner, a Main (owner) Author/Creator simultaneously creates a structured non-linear interactive e-book available for digital publish as well as equipped with print-ready capabilities. This process is not limited to the amount of collaborating users within the respective interactive e-books' author-author relation area.

Creative Content Automation via Templates & Audio Linked Line-by-Line—The automated guidance sub-applications described herein features capabilities of voice recording line-to-line reading and book narration. Along with voice automation, the application collaborates with a single or multiple authors in narration recording as a guidance tool for the text as well as a pronunciation tool for the readers who are discovering new titles and new languages.

Users can utilize the described automation tools by entering the DIGI GLU asset management marketplace and downloading content within the environment. Users may also link their social networking accounts and then delegating their own social media and status feeds into their own custom or template-like e-book files which may include, for example, binding styles such as journal, diary, article, autobiography, itinerary, yearbook, and the like.

The collaboration between authors by sharing social media through multi-author multi-format structured print-ready methods provides a unique way for users and creators to convert their social memories into real memories without having them lost in the social media queue.

To assist in content automation, the user has the ability to control unlimited contact profiles in the user's profile where one or another can be enabled at any given time. In some implementations, each user may be limited to the use of one contact profile at a time. For example, Work, Home, On Vacation, or Not Available Temporarily.

Customizable Advertising Modules called DIGI GLU asset management which uses a non-linear structured trigger function pop-out panel for subscription or advertisement through both paid and non-paid accounts including free floating ad space or ad graphics that follow both paid and non-paid accounts, or paid and free content.

Static DIGI GLU asset management includes advertisements embedded by, for example, HTML and CSS in a trigger-based function varying in location on a digital and interactive e-book creation super positioned by the design studio.

Floating DIGI GLU asset management includes freeform floating ads that lay as movable and playable objects creating an object oriented advertising experience with the convenience of floating over important content but utilizing the free account as an environment for marketable and brand expansion resource.

Advertisements may have their own functional ftp content database, allowing for some products to link within the network; others link to outside the network, and others to sources of private or corporate resources.

The application environment facilitates advertising and marketing tools and techniques, which offer the user or client methods of advertising that include fixed-ratio modeling with both fixed and variable interval trials of presentation. Changes of the fixed ratio may be based on user account types where user account types are denoted by fee content, paid content, and paid or non-paid accounts. Advertising, marketing and promotional services may be used for networking and socializing opportunities for business and brand expansion or development.

The application environment features technology that enables multiple users to simultaneously collaborate to create, bookmark, annotate, and publicly share multi-layer, multi-format print-ready structured data and content over the Internet and from entirely different time zones, cities, and countries. Thus, interaction and collaboration is provided wherever the users are currently located.

The application environment facilitates techniques of automation, which present themselves within user-defined formats utilizing user defined/uploaded and integrated content from Social networking websites like Google.com, Facebook.com, and Twitter.com to produce content driven user-detailed vivid documents. Automation type effects in content delivery in the forms(s) of automated itinerary, presentation, automated yearbook and roster presentation, as well as simple or advanced user defined automation options.

File sharing services (e.g., providing a website featuring an application with custom-coded technology) enables users to upload and download electronic files. Author-Multi-Author or Author-Single Author content sharing services (e.g., providing a website featuring corresponding technology) enables users to upload, view, and download content (e.g., ThoughtSpace, digital photos, videos, media, etc.).

The application environment features technology that enables internet users to share documents, images and videos via print-ready structured book format. The environment also enables temporary use of downloadable and non-downloadable software allowing web site users to upload content in the form of photos, on-line videos, etc., for sharing with others for entertainment and advertisement purposes.

The application environment gives computer users the ability to upload, exchange and share content (e.g., ThoughtSpace, photos, videos, video logs, etc.). Technology that enables users to upload, edit and share photo scrapbooks is also provided. Users are given the ability to create customized web pages featuring user-defined information. The technology also allows users to upload, download, share and sell custom and branded digital documents.

Sample advertisement and automation features include: Advertisement module implementation (e.g., Ad-inserts); Integration of Automated Content Inclusion (e.g., Facebook importing for content); Automation of Source Data Delivery from input and output Social Networking resources (e.g., Twitter, Facebook); Expansion into pre-cut or template options to provide users with outlook into the possibilities of use; and Output to Physical Text Formats through Publishing and Printing.

Sample automated itinerary features include: Automating Itinerary Integration as well as automated inclusion of source data via Twitter or Facebook or ThoughtSpace (e.g., user thoughts stored in digital form at the server, the database, or elsewhere); Content Logging and Time Log/Location Log; Location & Source Data sync into integrated itinerary to develop automatic live itinerary scheduling along with media, content, and thoughts (e.g., from ThoughtSpace) input to live e-book format to share events with other and add events for others; Expansion into pre-cut or template options to provide users with outlook into the possibilities of use; Export and Print Out Options through Electronic Interactive Publishing, Digital Publishing, and Printing.

Sample defined (e.g., pre-defined) template inclusion features include: Expansion into pre-defined or template options develop a user base as well as to provide users with outlook into the possibilities of use; Templates for comic book or graphic novel (in Folder); Templates for yearbook or roster books for government or educational textbooks (in Folder); Templates for itineraries and travel logs (in Folder).

Sample user defined content importing features include: Utilization of the ThoughtSpace (e.g. thoughts), Google, Twitter, and Facebook importing scripts to incorporate user defined data into the e-books created through the platform; Utilization of this formatting will be included with itinerary automation and yearbook automation; Automation assists in the importing of social media and personal content into a single location or multiple locations at designated junctions.

Sample automated delivery features include: Automated output delivery from downloaded and included source code data from the ThoughtSpace (e.g. thoughts), Google, Facebook, and Twitter based on tag and category; Automated re-uptake of user data from shared and created content, and utilized through user established consent; Automated Twitter and Facebook Imported Scripts for ease of use data incorporation; Delivery methods include importing techniques from the ThoughtSpace (e.g. thoughts) as well as social media resources to provide user defined and automated BragBooks social product and content creation.

Sample DIGI GLU asset management features include: Click out tab modules referred to as DIGI GLU asset management; DIGI GLU asset management includes customizable advertisement tabs integrated into digitally interactive e-books created through the platform; DIGI GLU asset management can be customized by the user, or the user can allocate a proprietor to sponsor an advertisement, or sponsorship of the created electronic publications; DIGI GLU asset management may comprise an official method of advertisement on the network and may be used for private advertisement as well as corporate contract advertisement to suit the needs of every account type.

Sample non-paid structure features include: Non-Paid Structures will include randomized ad-inserts based on network distribution through various private or proprietary sources, non-discriminatory, and private or corporate vendors; Ad-inserts can be used for non-advertisement purposes but may be limited (e.g., to one non-advertisement); Ad-insert per page as "true" advertisement based ad-inserts may be limited (e.g., to two per page).

Sample paid structure features include: DIGI GLU asset management pay structure may be based on credit based creation; DIGI GLU asset management can be purchased and utilized per insert; Number of ad-inserts may be limited (e.g., maximum of 2 ad-inserts per page) or unlimited; DIGI GLU asset management may be used for non-advertisement purposes but may be limited (e.g., to one per page if "true" ad-inserts are limited to two-per page).

In some implementations, the process of advertising first starts off by adding, for example, a friend, an advertiser, a buddy, or an author. Once the user has added the friend, advertiser, buddy, or author, they can they take part in the advertising features of the entire website. In some implementations, the advertising features are conducted in dynamic DIGI GLU asset management floating advertisements and static DIGI GLU asset management trigger advertisements.

Advertisements are used for both paid and non-paid subscribers. An advertiser also can be either paid or non-paid. These characteristics may control which advertisements are seen (or how frequently they are seen).

Every user may have equal capability to create an advertisement or to incorporate a developed ad into the user's electronic publication (e-publication or e-book of its respective category). The Advertisers may be paid by companies or businesses for the content, product, or service of which they are advertising. In the same sense, an author, who is not so well known, can incorporate or integrate an advertisement with a well known name into a document by, for example, downloading the artwork for free or paying for it through the Advertising artwork area (e.g. DIGI GLU asset management marketplace). This could then give notoriety and fame to the author, as well as to any authors he or she is collaborating with because, if someone searches for the well known name, they can also find these authors (since they are advertising the well known name).

In some implementations, the environment provides a method of securing the data and content that the user is inputting while still presenting it in the visually bounded book fashion. The contents may be digitally protected to prevent a user from selecting text off the face of any of the pages of the electronic publication.

Also, to address certain copyright-related issues, a citation method, similar to creating a bibliography, is employed in some implementations. If there is another author from whom a first author would like to use content, the first author can request that content from the other author based on page and paragraph. Once permission is obtained, the content may be re-used.

As a specific example, a method of citation is carried out by Author 1 requesting text. Author 2 complies with the request by going to the environment, and selecting the requested text. Once the text has been selected, Author 2 can click on a "Create Cite" option, which will generate an XML code providing the selected content in a secure encrypted packet to send over to Author 1. Author 2 sends this XML code via, for example, messaging or email. Author 1 then takes the XML code and pastes it into the document at the desired location specified by Author 1 to site a previously existing electronic publication, as well as proprietary information from any users ThoughtSpace (e.g. stored thoughts). Author 1 now has the same content presenting the same text in his or her document, but is not able to copy any of the actual text or see the actual text itself. This protects Author 2 from Intellectual Property infringement as well as creates notoriety for Author 2. Content also may be protected by a lack of copy functions existing throughout the applications framework.

In the same sense, Author 1 protects himself as well from copyright infringement at the time and down the line, where if Author 2 alleges that the text was copied without authorization. In this case, there is evidence of a legitimate transfer of information since the citation is copied to the electronic publication and is bound to it. The citation may always show up, for example, as documented text extracted from Author 2's intellectual property and cited as either a main citation or a footnote.

Authoring Services include the actions permitted to creators and editors of novels, graphic novels, journals, articles, illustrators, photographers, and photojournalists. Authoring is a term used freely throughout the environment (e.g., website) to depict the action of users. An Author is the creator of any server-based e-book through the environment network and carries out all the necessary administration functionalities.

Session Requests include Session Check-In, Session Check-Out, Notification for Use of Chapter, and Notification for Disengage of Chapter. In some implementations, a Chapter TAG will not be removed, but will be greyed-out to depict Use of Chapter. Use of Chapter notification may be placed to subsequent author attempting access of Chapter. Automatic or manual session termination may be employed for Use of Chapter by the initial creating author.

Printing, Exporting, & Extension: Custom Print Options, Print Marketing, and Distribution of documents through a publication platform application (e.g., provided by the environment, Third Party Publishers, Independent Publishers). A publication platform may be used to market, campaign, publish, promote, distribute and sell a multi-format e-book, ready for immediate sale online. Through such a service, with the ability to export a book in multiple e-book formats, a book is readable on any e-reading device, including the Amazon Kindle, the Apple iPhone, Apple iPad, the Sony eBook Reader, the Barnes & Noble nook, a personal computer, Android devices with e-book reading capabilities as well as others and likewise can be sold to both online retailers as well as brick & mortar stores. In some implementations, content is not re-distributable to other networks without the use(s) of proper API's or software keys given forth by the electronic publication environment.

In some implementations, the environment is developed and implemented in C# and F# utilizing packets of Silverlight and JavaScript for the user interface (UI) under the ASP.NET and .NET framework(s) from Microsoft. The graphics provide a powerful UI that is both multi-touch device capable and allows the application to expand on the digital advantages of Simultaneous Multi-Author Multi-Layer Structured Non-Linear Collaborative Book or Publication Creation within the realm of desktop computers as well as digitally interactive tablets. In some implementations, the environment utilizes other codecs, J-query, Ajax, PHP, MySQL Management Studio, MySQL Server, Microsoft Visual Studio, and RadControls for the GUI. In some implementations, the environment interacts with the user through the use of the Silverlight plug-in for Internet Explorer, Google Chrome, Mozilla Firefox, Opera and Apple Safari.

In some implementations, the author-author collaboration takes place in a coded environment through which an author can collaborate with another author to create a structured non-linear interactive e-book which in itself is, for example, an XML structured "document" file which can be exported as a PDF and visible on web sites in a digitally interactive fashion providing non-linear collaborative publishing.

In its native XML web application markup language through the Silverlight plug-in, information which is created amongst multiple users on the same file at the same time is made capable by the uses of XML which creates a dynamic workflow for word processing applications where the user can publish a work (e.g., the only way that work is publically visible in some implementations), edit it, and re-publish it (publically visible), making the data that was inputted readily usable for a re-publish at all times—as well as the ability to un-publish (privatizing content).

Also, certain portions of text can be saved through XML coding which allows the user to use text from one document, into multiple places without re-entering the data (e.g., like a digital "clipboard" allowing for copy-paste functions).

Figure 12:
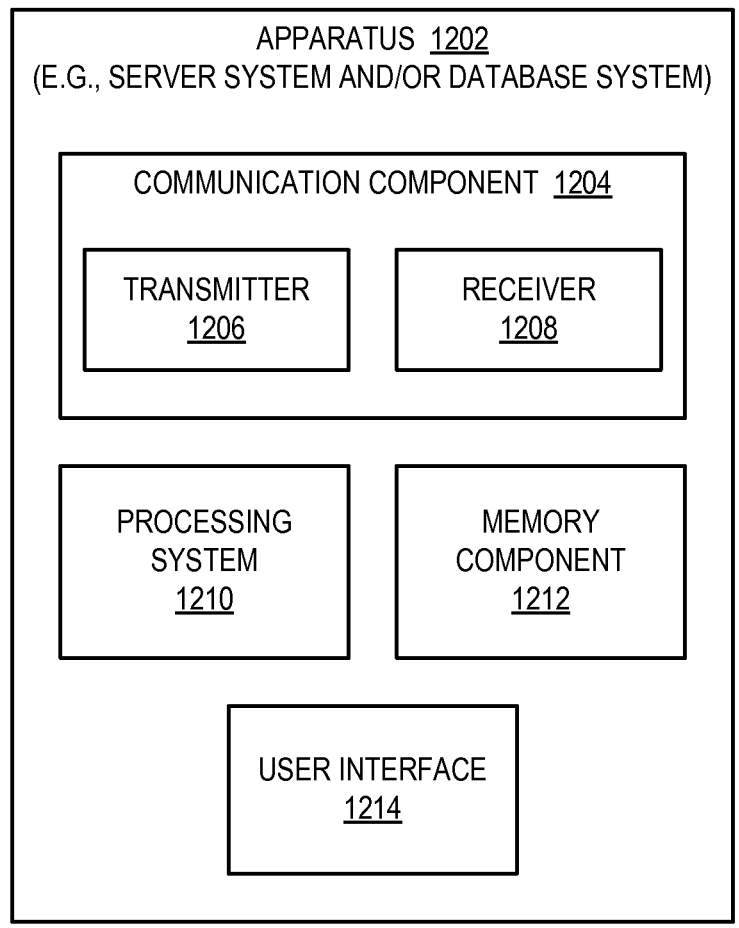
FIG. 12 is a simplified block diagram of several sample aspects of components that may be employed in an apparatus.

FIG. 12 illustrates several sample components (represented by corresponding blocks) that may be incorporated into an apparatus 1202 (e.g., corresponding to the server system 102 and/or the database system 104 of FIG. 1) to perform electronic publication management operations as taught herein. It should be appreciated that these components may be implemented in different types of apparatuses in different implementations (e.g., in a computing system, in an ASIC, in a system on a chip (SoC), etc.). The described components also may be incorporated into other apparatuses in a network system. For example, other apparatuses in a system may include components similar to those described for the apparatus 1202 to provide similar functionality. Also, a given apparatus may contain one or more of the described components. For example, an apparatus may include multiple communication components that enable the apparatus to communicate via different technologies.

The apparatus 1202 includes at least one communication component (represented by the communication component 1204) for communicating with other apparatuses via an appropriate communication technology. For example, the communication component 1204 may comprise a network interface that is configured to communicate with one or more network entities via a wire-based or wireless link. In some aspects, the communication component 1204 may be implemented as a transceiver configured to support wire-based or wireless signal communication. This communication may involve, for example, sending and receiving: messages, parameters, digital content, other types of information, and so on. Accordingly, in the example of FIG. 12, the communication component 1204 is shown as comprises a transmitter 1206 and a receiver 1208.

The apparatus 1202 also includes other components that may be used in conjunction with electronic publication management operations as taught herein. For example, the apparatus 1202 includes a processing system 1210 for providing functionality relating to electronic publication management and for providing other processing functionality. In some aspects, the processing system 1210 is configured to perform one or more of: identifying at least one section of an electronic publication; associating the stored digital content with the identified at least one section; sending at least one message to invoke concurrent display of the associated digital content and identified at least one section; logging information relating to the association of the digital content with the identified at least one section; identifying, for each digital content item, a user associated with the digital content item; identifying, for each user, at least one of the sections of the electronic publication associated with the user; identifying, for each of the digital content items, one of the sections of the electronic publication within which the digital content item is to be displayed; providing concurrent access to the electronic publication; logging information indicative of at least one attribute of each access of the section; obtaining parameters associated with a first one of the users; using a first one of the parameters to acquire information associated with the first user from a social media server; incorporating the acquired information into a section of the electronic publication as designated by a second one of the parameters; obtaining advertisement information; identifying a section of the electronic publication within which the advertisement information is to be included; or incorporating the advertisement information into the identified section of the electronic publication. The apparatus 1202 includes a memory component 1212 for maintaining information (e.g., digital content relating to electronic publications managed by the system, a set of templates, program code, etc.). The memory component 1212 may take various forms. In some embodiments, the memory component 1212 includes at least one memory device. In some embodiments, the memory component 1212 comprises a database system. The apparatus 1202 includes a user interface device 1214 for providing indications (e.g., audible and/or visual indications) to a user of the apparatus and/or for receiving input from the user (e.g., upon user actuation of a sensing device such a keypad, a touch screen, a microphone, and so on).

For convenience, the apparatus 1202 is shown in FIG. 12 as including components that may be used in the various examples described herein. In practice, the illustrated blocks may have different functionality in different implementations. For example, in some implementations, the functionality of the block 1210 may be different in an embodiment that provides server functionality as compared to an embodiment that provides database functionality.

The components of FIG. 12 may be implemented in various ways. In some implementations, the components of FIG. 12 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 1204-1214 may be implemented by processor and memory component(s) of the apparatus (e.g., by execution of appropriate code and/or by appropriate configuration of processor components).

It should be appreciated that various modifications may be incorporated into the disclosed embodiments based on the teachings herein. For example, the structure and functionality taught herein may be incorporated into types of apparatuses other than the specific types of apparatuses described above. Different embodiments of such an apparatus may include a variety of hardware and software processing components. In some embodiments, hardware components such as processors, controllers, state machines, logic, or some combination of these components, may be used to implement the described components or circuits.

The components and functions described herein may be connected or coupled in many different ways. The manner in which this is done may depend, in part, on whether and how the components are separated from the other components. In some embodiments, some of the connections or couplings represented by the lead lines in the drawings may be in an integrated circuit, on a circuit board, in a network, or implemented in other ways. The signals discussed herein may take various forms. For example, in some embodiments a signal may comprise electrical signals transmitted over a wire, light pulses transmitted through an optical medium such as an optical fiber or air, or RF waves transmitted through a medium such as air, and so on. In addition, a plurality of signals may be collectively referred to as a signal herein. The signals discussed above also may take the form of data. For example, in some embodiments an application program may send a signal to another application program. Such a signal may be stored in a data memory.

Figure 13:
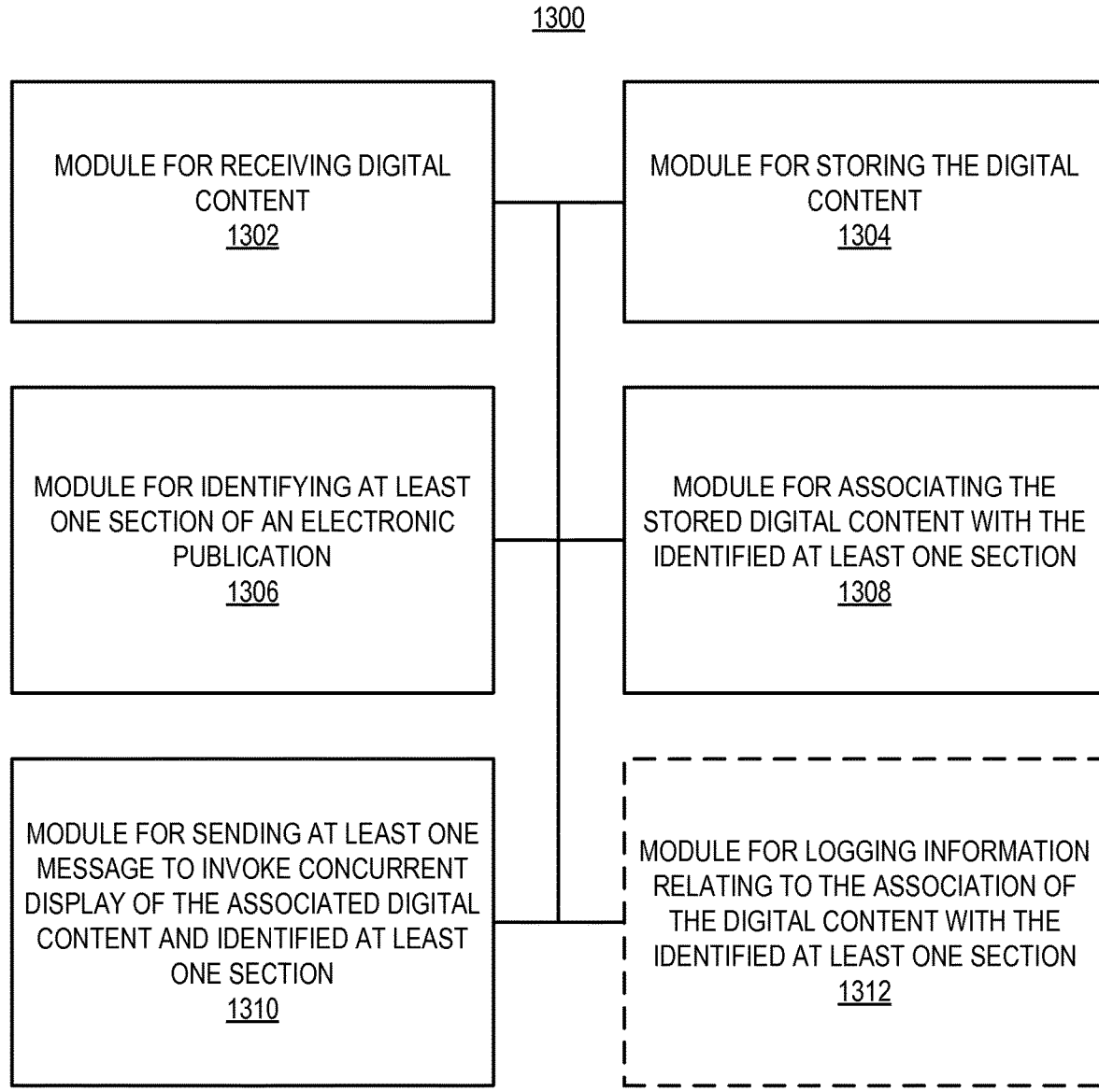
FIGS. 13-15 are simplified block diagrams of several sample aspects of apparatuses configured to support electronic publication management as taught herein.
Figure 14:
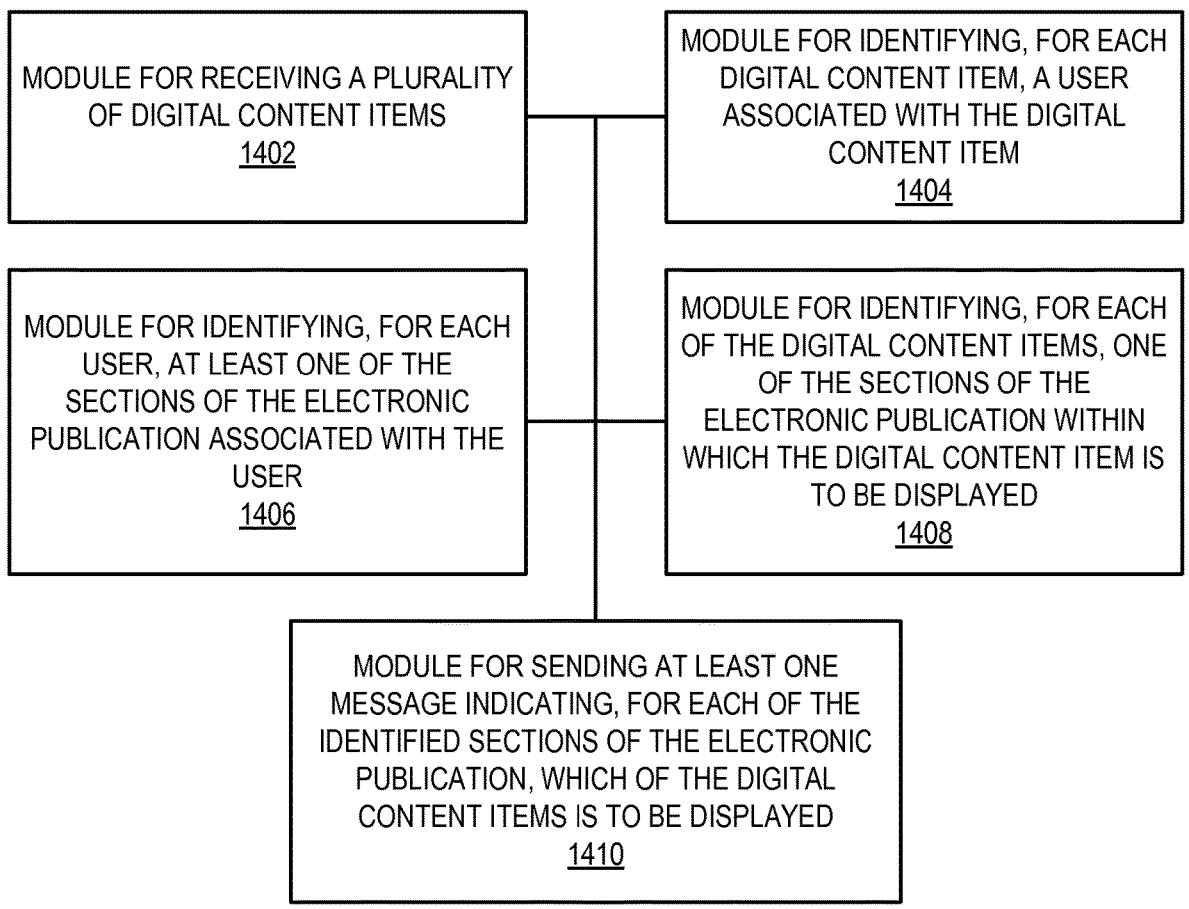
Figure 15:
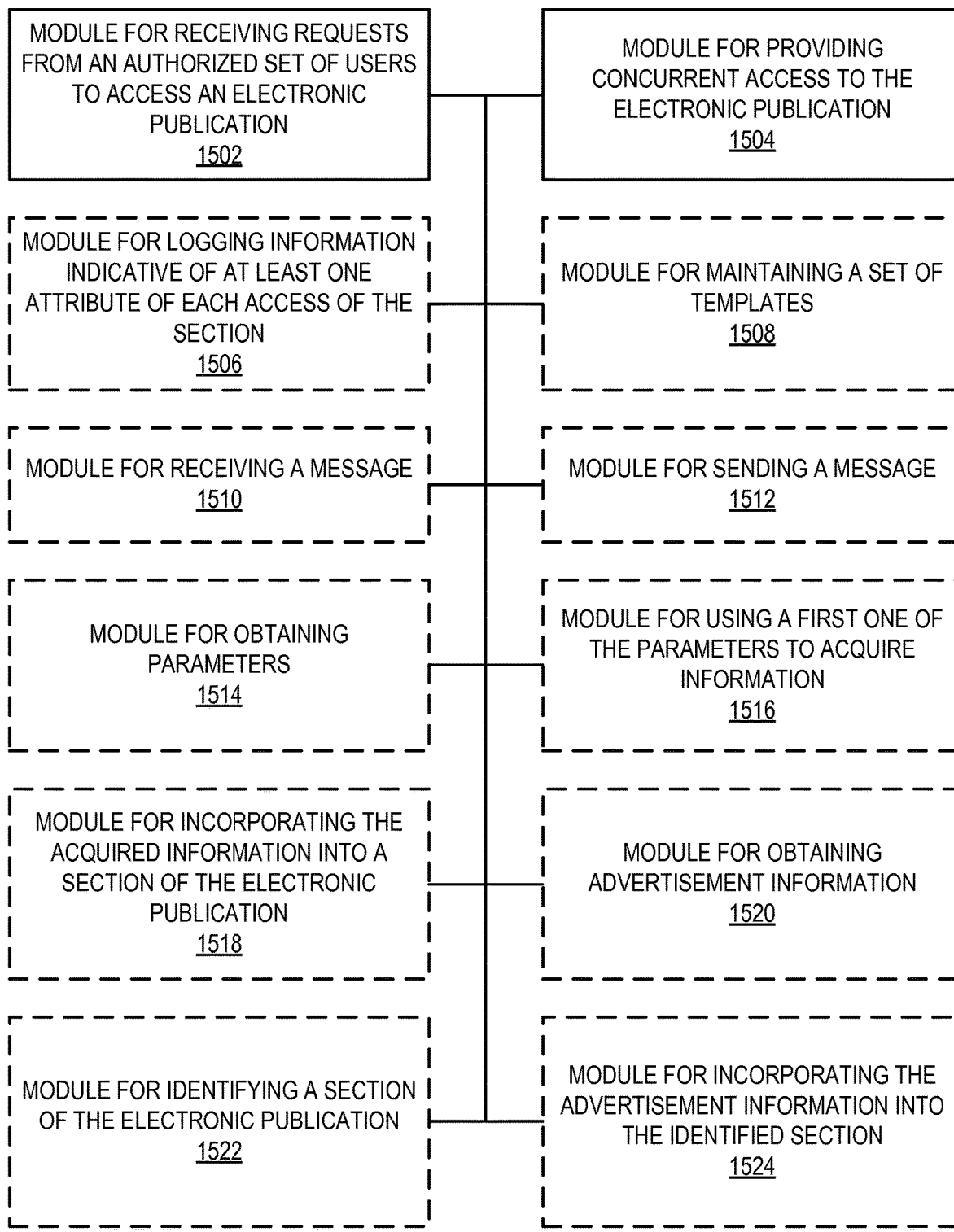

The components described herein may be implemented in a variety of ways. Referring to FIGS. 13-15, apparatuses 1300, 1400, and 1500 are represented as a series of interrelated functional blocks that represent functions implemented by, for example, one or more integrated circuits (e.g., processor and/or ASIC) or implemented in some other manner as taught herein. As discussed herein, an integrated circuit may include a processor, software, other components, or some combination thereof.

The apparatus 1300 includes one or more modules that perform one or more of the functions described above with regard to various figures. For example, a module for receiving digital content 1302 corresponds to, for example, a communication component and/or a processing system as discussed herein. A module for storing the digital content 1304 corresponds to, for example, a memory component as discussed herein. A module for identifying at least one section of an electronic publication 1306 corresponds to, for example, a processing system and/or a receiver as discussed herein. A module for associating the stored digital content with the identified at least one section 1308 corresponds to, for example, a processing system as discussed herein. A module for sending at least one message to invoke concurrent display of the associated digital content and identified at least one section 1310 corresponds to, for example, a communication component and/or a processing system as discussed herein. A module for logging information relating to the association of the digital content with the identified at least one section 1312 corresponds to, for example, a processing system as discussed herein.

The apparatus 1400 includes one or more modules that perform one or more of the functions described above with regard to various figures. For example, a module for receiving a plurality of digital content items 1402 corresponds to, for example, a communication component and/or a processing system as discussed herein. A module for identifying, for each digital content item, a user associated with the digital content item 1404 corresponds to, for example, a memory component as discussed herein. A module for identifying, for each user, at least one of the sections of the electronic publication associated with the user 1406 corresponds to, for example, a processing system and/or a receiver as discussed herein. A module for identifying, for each of the digital content items, one of the sections of the electronic publication within which the digital content item is to be displayed 1408 corresponds to, for example, a processing system as discussed herein. A module for sending at least one message indicating, for each of the identified sections of the electronic publication, which of the digital content items is to be displayed 1410 corresponds to, for example, a communication component and/or a processing system as discussed herein.

The apparatus 1500 includes one or more modules that perform one or more of the functions described above with regard to various figures. For example, a module for receiving requests from an authorized set of users to access an electronic publication 1502 corresponds to, for example, a communication component and/or a processing system as discussed herein. A module for providing concurrent access to the electronic publication 1504 corresponds to, for example, a memory component as discussed herein. A module for logging information indicative of at least one attribute of each access of the section 1506 corresponds to, for example, a processing system and/or a receiver as discussed herein. A module for maintaining a set of templates 1508 corresponds to, for example, a memory component as discussed herein. A module for receiving a message 1510 corresponds to, for example, a communication component and/or a processing system as discussed herein. A module for sending a message 1512 corresponds to, for example, a communication component and/or a processing system as discussed herein. A module for obtaining parameters 1514 corresponds to, for example, a processing system as discussed herein. A module for using a first one of the parameters to acquire information 1516 corresponds to, for example, a communication component and/or a processing system as discussed herein. A module for incorporating the acquired information into a section of the electronic publication 1518 corresponds to, for example, a processing system as discussed herein. A module for obtaining advertisement information 1520 corresponds to, for example, a processing system as discussed herein. A module for identifying a section of the electronic publication 1522 corresponds to, for example, a communication component and/or a processing system as discussed herein. A module for incorporating the advertisement information into the identified section 1524 corresponds to, for example, a processing system as discussed herein.

As noted above, in some aspects these modules may be implemented via appropriate processor components. These processor components may in some aspects be implemented, at least in part, using structure as taught herein. In some aspects, a processor may be configured to implement a portion or all of the functionality of one or more of these modules. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. In some aspects one or more of any components represented by dashed boxes are optional.

As noted above, the apparatuses 1500, 1600, and 1700 comprise one or more integrated circuits in some implementations. For example, in some aspects a single integrated circuit implements the functionality of one or more of the illustrated components, while in other aspects more than one integrated circuit implements the functionality of one or more of the illustrated components.

In addition, the components and functions represented by FIGS. 15-17 as well as other components and functions described herein, may be implemented using any suitable means. Such means are implemented, at least in part, using corresponding structure as taught herein. For example, the components described above in conjunction with the "ASIC for" components of FIGS. 15-17 correspond to similarly designated "means for" functionality. Thus, one or more of such means is implemented using one or more of processor components, integrated circuits, or other suitable structure as taught herein in some implementations.

In some aspects, an apparatus or any component of an apparatus may be configured to (e.g., operable to) provide functionality as taught herein by, for example, manufacturing (e.g., fabricating) the apparatus or component so that it will provide the functionality, by programming the apparatus or component so that it will provide the functionality, or through the use of some other suitable configuring means.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer-readable medium (e.g., tangible media, computer-readable storage media, etc.). In addition, in some aspects computer-readable medium may comprise transitory computer readable medium (e.g., comprising a signal). Combinations of the above should also be included within the scope of computer-readable media. It should be appreciated that a computer-readable medium may be implemented in any suitable computer-program product.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An authoring method performed by a computer system, the method comprising:
   receiving publication information from a first author to create an electronic book comprising a plurality of chapters, wherein the publication information specifies at least one other author that is allowed to access the electronic book, and wherein the publication information specifies a plurality of content providers that are allowed to provide content for the electronic book;
   storing the publication information and the electronic book on a first server;
   receiving, from a first content provider of the plurality of content providers, a first set of templates for incorporating content into the electronic book, wherein the first content provider is different from the first author, wherein a first template of the first set of templates specifies a first text area indicating where first text is to be placed on a page of the electronic book, and wherein a second template of the first set of templates specifies a second text area indicating where second text is to be placed on a page of the electronic book;
   receiving, from a second content provider of the plurality of content providers, a second set of templates for incorporating content into the electronic book, wherein the second content provider is different from the first author and the first content provider, wherein a third template of the second set of templates specifies a first image area indicating where a first image is to be placed on a page of the electronic book;
   storing the first set of templates and the second set of templates on the first server or a second server;
   sending a first message indicating that the at least one other author is allowed to access the electronic book;

receiving a request from a second author of the at least one other author to access the electronic book, wherein the second author is different from the first author, the first content provider, and the second content provider;

sending a second message to present the electronic book, the first set of templates, and the second set of templates to the second author;

receiving a third message from the second author, wherein the third message identifies first digital content stored on a third server, wherein the third message comprises a first indication that the first digital content is to be included on a first page of a first chapter of the plurality of chapters of the electronic book according to the first template, wherein the third message identifies second digital content stored on the third server, and wherein the third message comprises a second indication that the second digital content is to be included on a second page of the first chapter of the electronic book according to the second template, wherein the third message identifies third digital content stored on the third server, and wherein the third message comprises a third indication that the third digital content is to be included on a third page of the first chapter of the electronic book according to the third template;

receiving the first digital content, the second digital content, and the third digital content from the third server;

generating a fourth message to invoke display of the electronic book on a web page, wherein the fourth message indicates that the first digital content is to be displayed at the first text area on the first page as specified by the first template, wherein the fourth message indicates that the second digital content is to be displayed at the second text area on the second page as specified by the second template, and wherein the fourth message indicates that the third digital content is to be displayed at the first image area on the third page as specified by the third template; and sending the fourth message to a client device.

2. The method of claim 1, wherein: the publication information specifies a plurality of advertisers that are allowed to provide advertisement content for the electronic book;

the publication information specifies first advertising information to be incorporated into the electronic book for display to the at least one other author during creation of the electronic book, wherein the first advertising information is for a first advertiser of the plurality of advertisers;

the first digital content specifies second advertising information to be incorporated into the electronic book for display to an end user after the creation of the electronic book, wherein the second advertising information is for a second advertiser of the plurality of advertisers; and the second advertising information is different from the first advertising information.

3. The method of claim 2, wherein the fourth message further indicates that:

the first advertising information is to be displayed within the electronic book at a first periodicity based on a first subscription rate associated with the first author; and the second advertising information is to be displayed within the electronic book at a second periodicity based on a second subscription rate associated with the end user, wherein the second periodicity is different from the first periodicity, and wherein the second subscription rate is different from the first subscription rate.

4. The method of claim 2, wherein the fourth message further indicates that the second advertising information is to be displayed to the end user after the end user has turned a defined number of pages.

5. The method of claim 1, wherein the first digital content further specifies:

a section of the electronic book within which a playable floating object is to be displayed; and when the playable floating object is to be displayed within the electronic book.

6. The method of claim 5, wherein:

the first digital content further specifies that the playable floating object is to be displayed within the electronic book after a user has paid for the playable floating object; and the display of the playable floating object is triggered by the user paying for the playable floating object.

7. The method of claim 1, wherein the receiving of the first digital content comprises: receiving at least one information importing parameter designated for the electronic book; and using a first one of the at least one information importing parameter to acquire from a server system, information to be associated for use in the electronic book, wherein the at least one information importing parameter specifies at least one condition when a user has received a message to edit a displayed section.

8. The method of claim 1, wherein the first digital content specifies at least one condition for displaying the first digital content in the electronic book, and the at least one condition is based on whether a user has received a message to edit a displayed section.

9. The method of claim 1, wherein the receiving of the first digital content comprises: receiving information importing parameters designated for the electronic book; and using a first one of the information importing parameters to acquire, from a server system, information to be associated with the electronic book.

10. The method of claim 9, wherein the first one of the information importing parameters indicates at least one type of information to be imported from the server system, and the at least one type of information comprises a list of recorded text stored at the server system.

11. The method of claim 9, wherein a second one of the information importing_parameters indicates at least one field of the electronic book into which the information to be associated with the electronic book is to be incorporated.

12. The method of claim 1, further comprising:

receiving third digital content specifying a list of recorded text for non-linear editing of the electronic book and an indication of how the list of recorded text is to be displayed within the electronic book, where the list of recorded text is to be displayed within the electronic book, and a time at which the list of recorded text is to be displayed within the electronic book, wherein the list of recorded text comprises a first thought entry and a time the first thought entry was recorded and a second thought entry and a time the second thought entry recorded, and wherein the third digital content specifying the list of recorded text is created by a first user and the indication is created by a second user different from the first user;

generating a fifth message to invoke display of the list of recorded text within the electronic book on the web page according to the indication of how the list of recorded text is to be displayed within the electronic book, where the list of recorded text is to be displayed within the electronic book, and the time at which the list of recorded text is to be displayed within the electronic book; and sending the fifth message to the client device.

13. The method of claim 12, further comprising:
automatically incorporating the list of recorded text into a section of the electronic book after determining that an author of the list of recorded text has authorized use of the list of recorded text in the electronic book and after determining that a user of the electronic book is authorized to use the list of recorded text.

14. The method of claim 12, wherein the third digital content further specifies:
where the list of recorded text is to be displayed within the electronic book;
a section of the electronic book within which the list of recorded text is to be displayed; and
when the list of recorded text is to be displayed within the electronic book.

15. The method of claim 12, wherein:
the third digital content further specifies that the list of recorded text is to be displayed within the electronic book after a third user has paid for the list of recorded text; and
the display of the list of recorded text is triggered by the third user paying for the list of recorded text.

16. The method of claim 12, wherein the list of recorded text comprises an instruction to edit a displayed section, the method further comprising logging information relating to the instruction.

17. The method of claim 12, further comprising storing data in a database at a server location, wherein the data is for determining and calculating instructions to edit a displayed section and lists containing recorded text stored for each user in the database at the server location.

18. The method of claim 1, further comprising:
storing the publication information as a section of the electronic book;
sending a fifth message to publish the section of the electronic book on a first web page;
receiving an instruction to non-linearly edit the section of the electronic book;
revising the section of the electronic book according to the instruction; and
generating a sixth message to republish the revised section of the electronic book on the first web page; and
sending the sixth message.

19. The method of claim 18, wherein the instruction to non-linearly edit the section of the electronic book comprises a request to revise the section of the electronic book after the section has been displayed on the first web page.

20. The method of claim 18, wherein the instruction to non-linearly edit the section of the electronic book comprises a request to incorporate a digital content item into the electronic book, the method further comprising:
generating digital content marketplace information, wherein the digital content marketplace information indicates that the digital content item is available for purchase;
sending a seventh message to display the digital content marketplace information on a second web page; and
determining that a user of the electronic book paid for the digital content item;
wherein the revising of the section of the electronic book according to the instruction comprises incorporating the digital content item into the electronic book as a result of the determining that the user of the electronic book paid for the digital content item.

21. The method of claim 20, wherein the instruction further specifies where the digital content item is to be displayed within the electronic book.

22. The method of claim 20, wherein:
the instruction further specifies that the digital content item is to be displayed within the electronic book after the user has paid for a list of recorded text; and
the republishing of the revised section of the electronic book on the first web page is triggered by the user paying for the list of recorded text.

23. The method of claim 18, wherein the instruction further specifies when a digital content item is to be displayed within the electronic book.

24. The method of claim 23, wherein: when the digital content item is to be displayed is based on receipt of a seventh message sent to a user that comprises an instruction to edit at least one displayed section of the electronic book, and the electronic book contains digital content comprising text from a recorded list, and the seventh message provides a trigger for republishing of the at least one displayed section.

25. The method of claim 24, wherein the trigger defines when the digital content is displayed.

26. The method of claim 18, further comprising: receiving the publication information as a seventh message from a server system, and storing the publication information in a list of recorded text.

27. The method of claim 18, wherein the revising of the section of the electronic book according to the instruction comprises incorporating a digital content item into the electronic book as a result of a user of the electronic book confirming items from a list of recorded text containing digital content items for use in the electronic book and for use in an at least one section of a displayed section.

28. The method of claim 18, wherein the instruction further specifies that a digital content item is to be displayed within the electronic book based on text that is in a recorded list or based on a confirmation of an instructions to edit a displayed section.

29. The method of claim 18, wherein the republishing of the revised section of the electronic book on the first web page is further triggered by a confirmation of text that is in a recorded list or a confirmation of instructions to edit a displayed section.

30. The method of claim 1, wherein:
the first template further specifies a first image area indicating where a first image is to be placed on a page of the electronic book; and
the second template further templates specifies a second image area indicating where a second image is to be placed on a page of the electronic book.

31. The method of claim 1, wherein:
a fourth template of the second set of templates specifies a third text area indicating where third text is to be placed on a page of the electronic book;
the third message further identifies fourth digital content stored on the third server;
the third message further comprises a fourth indication that the fourth digital content is to be included on the first page of the first chapter of the electronic book according to the fourth template; and
the fourth message indicates that the fourth digital content is to be displayed at the fourth image area on the firth page as specified by the fourth template.

* * * * *